US010859125B2

(12) United States Patent
Cioc et al.

(10) Patent No.: US 10,859,125 B2
(45) Date of Patent: Dec. 8, 2020

(54) SELECTABLE ONE-WAY CLUTCH WITH ELECTROMAGNETIC ACTUATOR AND DIRECT-ACTING STRUT ASSEMBLY HAVING AN ACTIVE STRUT AND STRUT BIASING ARRANGEMENT

(71) Applicant: Magna Powertrain, Inc., Concord (CA)

(72) Inventors: Adrian Cioc, Richmond Hills (CA); Stephen Yang, Toronto (CA)

(73) Assignee: MAGNA POWERTRAIN INC., Concord (CA)

( * ) Notice: Subject to any disclaimer, the term of this patent is extended or adjusted under 35 U.S.C. 154(b) by 51 days.

(21) Appl. No.: 16/249,075

(22) Filed: Jan. 16, 2019

(65) Prior Publication Data

US 2019/0226533 A1 Jul. 25, 2019

Related U.S. Application Data

(60) Provisional application No. 62/620,544, filed on Jan. 23, 2018.

(51) Int. Cl.
| | |
|---|---|
| *F16D 27/118* | (2006.01) |
| *F16D 41/12* | (2006.01) |
| *F16D 27/102* | (2006.01) |
| *F16D 47/04* | (2006.01) |
| *F16D 41/08* | (2006.01) |
| *F16D 41/06* | (2006.01) |

(52) U.S. Cl.
CPC .......... *F16D 27/118* (2013.01); *F16D 27/102* (2013.01); *F16D 41/12* (2013.01); *F16D 41/084* (2013.01); *F16D 2041/0603* (2013.01)

(58) Field of Classification Search
CPC ...... F16D 27/118; F16D 27/102; F16D 47/04; F16D 41/14; F16D 27/14; F16D 2041/0603; F16D 2041/0605; F16D 41/30; F16D 41/12–16
See application file for complete search history.

(56) References Cited

U.S. PATENT DOCUMENTS

| | | | |
|---|---|---|---|
| 6,186,299 B1 * | 2/2001 | Ruth | ....................... F16D 41/12 |
| | | | 192/46 |
| 6,290,044 B1 | 9/2001 | Burgman et al. | |
| 8,079,453 B2 | 12/2011 | Kimes | |
| 8,196,724 B2 | 6/2012 | Samie et al. | |
| 8,276,725 B2 | 10/2012 | Swales et al. | |
| 8,418,825 B2 | 4/2013 | Bird | |
| 8,491,439 B2 | 7/2013 | Kimes | |
| 2013/0113263 A1 * | 5/2013 | Yamada | ................ B60N 2/995 |
| | | | 297/423.19 |

(Continued)

Primary Examiner — Mark A Manley
(74) Attorney, Agent, or Firm — Dickinson Wright PLLC

(57) ABSTRACT

A controllable one-way clutch assembly having a clutch module and an actuator module mounted to a first clutch member of the clutch module. The actuator module includes an electromagnetic actuator equipped with an energizeable coil assembly, a strut moveable in response to energization of the coil assembly from a released position to a locked position with respect to ratchet teeth formed on a second clutch member of the clutch module, and a strut spring biasing the strut toward its released position. The strut spring is configured to provide an anti-tilting feature.

20 Claims, 18 Drawing Sheets

(56) References Cited

U.S. PATENT DOCUMENTS

2014/0062174 A1* 3/2014 Chen .................. F16D 41/30
                                                    301/110.5
2016/0265609 A1* 9/2016 Corsetti ............... F16D 41/30
2018/0003247 A1* 1/2018 Samie .................. F16D 28/00

* cited by examiner

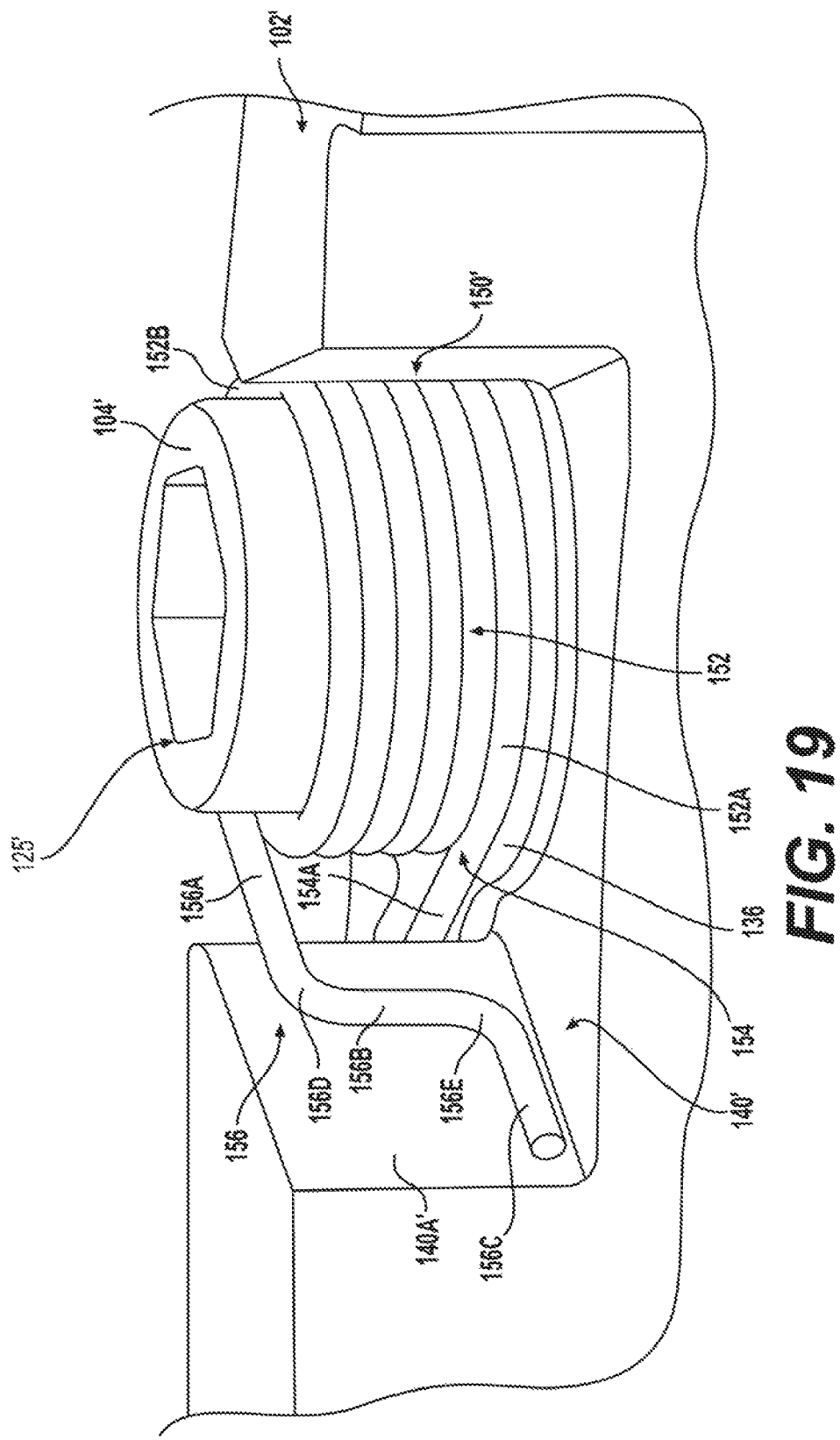

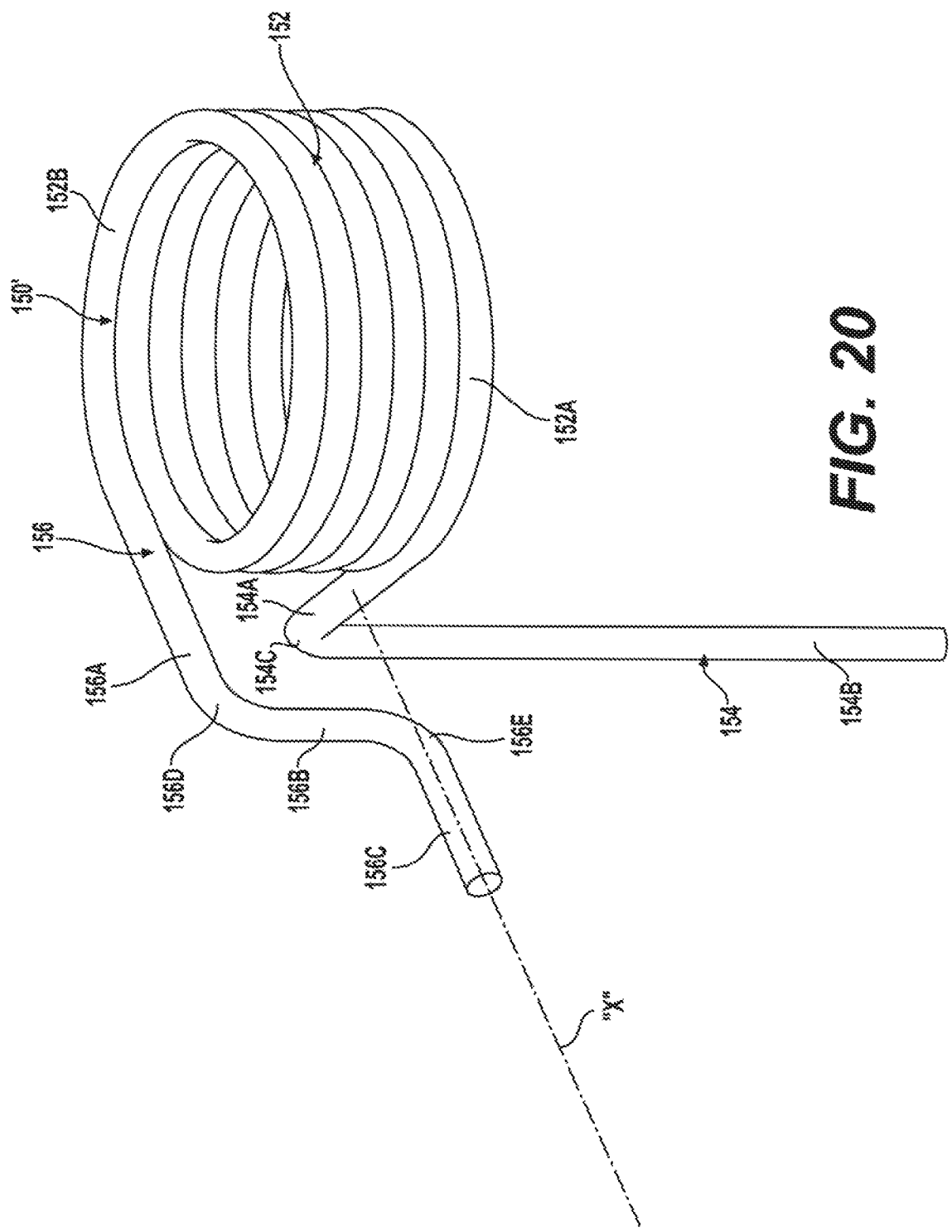

SELECTABLE ONE-WAY CLUTCH WITH ELECTROMAGNETIC ACTUATOR AND DIRECT-ACTING STRUT ASSEMBLY HAVING AN ACTIVE STRUT AND STRUT BIASING ARRANGEMENT

CROSS-REFERENCE TO RELATED APPLICATIONS

This application claims the benefit of and priority to U.S. Provisional Application No. 62/620,544, filed Jan. 23, 2018 the entire disclosure of which is incorporated herein by reference.

FIELD OF THE DISCLOSURE

The present disclosure is generally related to overrunning coupling devices such as one-way clutches and brakes. More specifically, the present disclosure is directed to selectable one-way coupling (SOWC) devices and/or electrically-controlled one way coupling (EOWC) devices equipped with an electromagnetic actuator and a direct-acting strut assembly having an active strut and a strut biasing arrangement providing an anti-tilt feature.

BACKGROUND OF THE DISCLOSURE

This section provides background information related to the present disclosure which is not necessarily prior art.

Automatic transmissions provide a plurality of forward and reverse speed or gear ratios by selectively actuating one or more clutches and brakes to establish a torque-transmitting drive connection between a rotary input component and a rotary output component for supplying motive power (i.e., drive torque) from a powertrain to a driveline in a motor vehicle. One type of brake or clutch widely used in automatic transmission is an overrunning coupling device, commonly referred to as a one-way clutch (OWC). The one-way clutch operates in a freewheeling mode when one of its races (in radial coupling configuration) or one of its drive plates (in axial coupling configuration) rotates in a first (i.e., freewheel) direction relative to the other race or drive plate. In contrast, the one-way clutch operates in a locked mode when one of its races or drive plates attempts to rotate in a second (i.e., lockup) direction relative to the other race or drive plate. Typically, a locking member, commonly referred to as a strut, associated with the one-way clutch is moveable between a non-deployed position to establish the freewheeling mode and a deployed position to establish the locked mode. The strut is commonly biased by a strut spring toward one of its two distinct positions. Such conventional one-way clutches provide no independent control over their modes of operation, that is to say whether they lockup or freewheel in both directions and are commonly referred to as "passive" one-way clutches. Thus, basic one-way clutches provide the locked mode in one rotary direction and the freewheeling mode in the opposite direction based on the direction that the drive torque is being applied to the input race or drive plate.

There are however, requirements in modern automatic transmissions where a "controllable" overrunning coupling device or a one-way clutch, commonly referred to as either a selectable one-way clutch (SOWC) or an electrically-controlled one-way clutch (EOWC), can be controlled to provide additional functional modes of operation. Specifically, a controllable one-way clutch may further be capable of providing a freewheeling mode in both rotary directions until a command signal (i.e., from the transmission controller) causes a power-operated actuator to shift the coupling device into its locked mode by moving the strut into its deployed position. Thus, a controllable one-way clutch may be capable of providing a drive connection between an input member and an output member in one or both rotational directions and it may also be operable to freewheel in one or both directions. It is also known in modern automatic transmissions to integrate a passive one-way clutch and a controllable one-way clutch into a combined coupling device, commonly referred to as a bi-directional clutch.

In some instances, the controllable one-way clutches installed in automatic transmissions utilize a hydraulic actuator to selectively actuate the overrunning coupling and shift between the available operating modes. Examples of conventional controllable one-way clutches that are hydraulically-actuated are disclosed in U.S. Pat. Nos. 6,290,044, 8,079,453 and 8,491,439. It is also known to use an electromechanical actuator with the electrically-controlled one-way clutch, one example of which is disclosed in U.S. Pat. No. 8,196,724. As a further alternative, much development has recently been directed to electromagnetic actuators for use with electrically-controlled one-way clutches, examples of which are disclosed in U.S. Pat. Nos. 8,276,725 and 8,418,825. In many electromagnetic actuators, a rocker-type strut is pivoted from its non-deployed position to its deployed position in response to energization of a coil assembly. In some such electrically-controlled one-way clutches, a "direct" strut actuation configuration is used such that the strut is part of the magnetic circuit and its pivotal movement is caused by an attraction force applied directly to the strut via energization of the coil assembly. Therefore, precise control of the air gap established between the core/pole piece of the coil assembly and the magnetic strut is required to provide robust and reliable lockup functionality. As an alternative, some electrically-controlled one-way clutches are equipped with an electromagnetic actuator having an "indirect" strut actuation configuration in which an intermediate component, such as an armature or a linkage, is arranged to cause pivotal movement of the non-magnetic strut in response to energization of the coil assembly.

Each strut is mounted within a strut pocket formed in the clutch housing for pivotal movement between its non-deployed and deployed positions. As noted, a strut spring is commonly used to bias the strut toward its non-deployed position upon de-energization of the coil assembly. In many conventional arrangements, a helical coil spring mounted within a spring pocket in the clutch housing engages the strut (or the armature/linkage in indirect configurations) and exerts a return force on the strut. In other arrangements, a torsion spring is used to bias the strut. Typically, a coiled portion of the torsion spring is concentrically mounted on a pivot post extending from the strut. A first tang portion of the torsion spring is in contact with the strut while a second tang portion of the torsion spring is in contact with the clutch housing pivotally supporting the strut. When the strut is actuated (i.e., "passively" via centrifugal action or "actively" via a power-operated actuator) for movement from its non-deployed position into its deployed position, the coiled portion of the torsion spring winds around the pivot post and provides a return torque that opposes the actuating torque exerted on the strut. When strut actuation is no longer required, the torsion spring unwinds and drives the strut back to its non-deployed position.

One known shortcoming associated with the use of conventional torsion springs in strut biasing arrangements is related to the distance or "offset" between the first and second tang portions. Specifically, when the torsion spring is loaded upon movement of the strut to its deployed position, a "tilting" action can occur due to the tangential loads acting on the two tang portions in different planes. As such, the coiled portion of the torsion spring tends to act primarily on one side of the pivot post, which can adversely affect the consistency of the spring rate. Additionally, this tilting action of the torsion spring may cause the first tang portion to move out of continuous contact with the strut which is also undesirable.

While traditional strut-type one-way clutches used in motor vehicle applications meet all requirements, a need exists to continue development of improved actuators and strut actuation arrangements for use in controllable one-way clutches that address and overcome issues, such as those noted above, and advance the functionality and packaging thereof.

SUMMARY OF THE DISCLOSURE

This section provides a general summary of the disclosure and is not intended to be considered a comprehensive listing of all of its aspects, features and objectives.

It is an aspect of the present disclosure to provide a controllable one-way clutch assembly adapted for use in a power transmission device.

It is a related aspect to provide an actuator module for use with controllable one-way clutch assembly having one of a direct or an indirect actuation configuration provided between a moveable actuation component of a power-operated actuator and a pivotably moveable locking element.

It is another related aspect to provide a one-way clutch assembly comprised of a clutch module and an actuator module. The actuator module includes a solenoid-type actuator having an energizeable coil assembly and a linearly-moveable actuation component, a pivotable strut, a strut biasing arrangement, and an indirect coupling arrangement between the strut and the actuation component operable for causing the strut to pivot between released (i.e., non-deployed) and locked (i.e., deployed) positions relative to ratchet teeth formed on a first clutch member associated with the clutch module in response to translation of the actuation component between first (i.e., retracted) and second (i.e., extended) positions. The strut biasing arrangement is operable to return the strut to its released position in response to movement of the actuation component to its retracted position.

It is another related aspect to provide a one-way clutch assembly comprised of a clutch module and an actuator module. The actuator module includes a solenoid-type actuator having an energizeable coil assembly and a linearly-moveable actuation component, a pivotable strut moveable between a released (i.e., non-deployed) position and a locked (i.e., deployed) position in response to movement of the actuation component between a first (i.e., retracted) position and a second (i.e., extended) position resulting from energization and de-energization of the coil assembly, and a strut biasing arrangement for moving the strut to its released position in response to movement of the actuation component to its retracted position upon de-energization of the coil assembly.

It is another related aspect of the present disclosure to provide an improved strut biasing arrangement that is configured to normally bias the pivotable strut toward its released position and provide an anti-tilting feature. In this regard, the strut biasing arrangement includes a torsion spring configured to provide the anti-tilting feature. The torsion spring includes a coiled segment adapted to be concentrically mounted on a pivot post extending from the strut, and first and second tang segments extending from the coiled segment and connecting the strut for pivotal movement relative to a second clutch member of the clutch module. The first and second tang segments each have leg portions that are generally aligned along a common plane to provide the anti-tilting feature.

In accordance with these and other aspects, the present disclosure is directed to a one-way clutch assembly including a clutch module having a first clutch component and a second clutch component arranged for rotation relative to the first clutch component and having ratchet teeth, and an actuator module mounted to the first clutch component and having an energizeable coil assembly with a moveable actuator member, a locking member, and a biasing member. The actuator member moves from a first position to a second position in response to energization of the coil assembly for causing concurrent movement of the locking member from a released position disengaged from the ratchet teeth to a locked position engaged with the locking teeth. The biasing member urges the locking member toward the released position. The biasing member provides an anti-tilting feature relative to the locking member. The locking member is a strut pivotally mounted to the first clutch component and having a pivot post. The biasing member is a torsion spring having a coiled section concentrically mounted on the pivot post, a first tang section engaging the strut, and a second tang section engaging the first clutch component. The first and second tangs each have a corresponding leg portion generally aligned along a common plane to provide an anti-tilting feature.

The present disclosure is further directed to such a torsion spring wherein the coiled section includes a plurality of interconnected coiled loops defined between a first coil loop from which the first tang section extends and a second coil loop from which the second tang section extends.

In accordance with a first embodiment of the torsion spring, the first tang section includes a first leg portion interconnected to a second leg portion via a bend section. The first leg portion of the first tang section is located adjacent to a side surface of the strut and the second leg portion of the first tang section engages a face surface of the strut. The second tang section includes a leg portion retained in a retention feature formed in the first clutch component. The offset between the first leg portion of the first tang section and the leg portion of the second tang section being minimized to provide the anti-tilting feature. The retention feature formed in the first clutch component is configured to be one of a notch and a bore within which the leg portion of the second tang section is disposed.

In accordance with a second embodiment of the torsion spring, the first tang section includes a first leg portion interconnected to a second leg portion via a bend portion. The first leg portion of the first tang section is located adjacent to a side surface of the strut and the second leg portion of the first tang section is retained in a retention bore formed in the strut. The second tang section includes a first leg portion interconnected via a first bend portion to a second leg portion and a second bend portion interconnecting the second leg portion to a third leg portion. The second and third leg portions of the second tang section are retained in a retention feature formed in the first clutch component. The offset between the first leg portion of the first tang section and the third leg portion of the second tang section being minimized to provide the anti-tilting feature.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 6 illustrates an alternative embodiment of an actuator module for a one-way clutch with the strut located in its locked/deployed position while

FIGS. 18 and 19 are isometric views of a portion of a controllable one-way clutch illustrating a strut and strut spring arrangement configured to embody the inventive concepts of the present disclosure; and FIG. 20 is an isometric view of the strut spring shown in FIGS. 18 and 19.

DESCRIPTION OF THE ENABLING EMBODIMENTS

Example embodiments will now be described more fully with reference to the accompanying drawings. In general, each embodiment is directed to a overrunning coupling device having at least a controllable one-way locking device (i.e., brake and/or clutch) including a moveable locking component (i.e., sprag, strut, etc.) that is controlled via an electromagnetic actuator. Thus, the controllable one-way locking device transmits torque mechanically but is actuated via an electrical actuation system. However, these example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
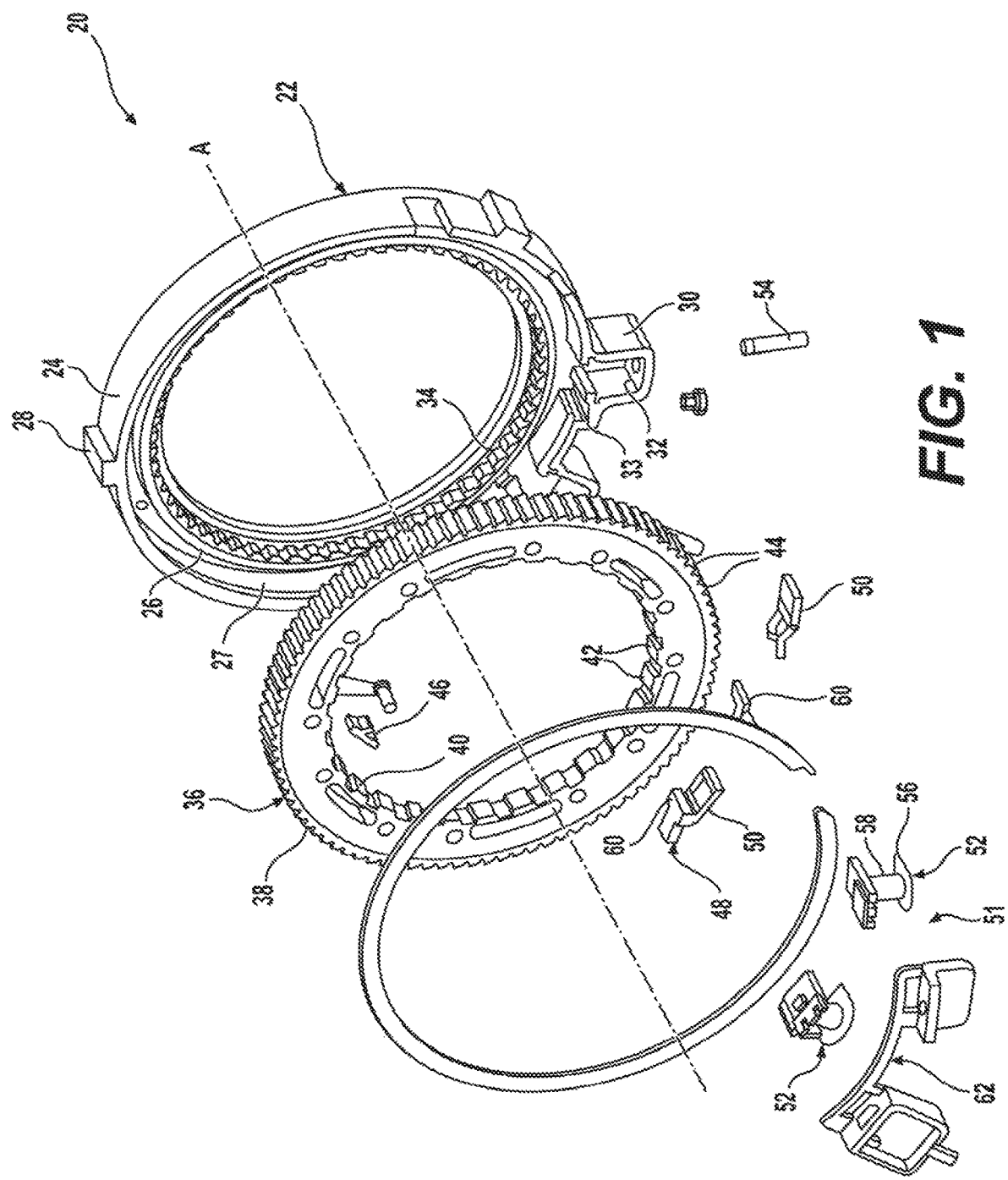
FIG. 1 is an exploded isometric view of a bi-directional clutch assembly configured to include a passive one-way clutch and a controllable one-way clutch.

Referring to FIG. 1, an example embodiment of a bi-directional clutch assembly 20 is generally shown in an exploded view. Bi-directional clutch assembly 20 is of a type adapted, for example, for use in an automatic transmission installed in a motor vehicle. Clutch assembly 20 includes a passive one-way clutch and "controllable" overrunning coupling device or one-way clutch, commonly referred to as an electrically-controlled one-way clutch (EOWC). For purposes of this application, the term "clutch assembly" should be interpreted to include couplings, clutches and brakes having one component coupled to a torque delivery component of the transmission and another component coupled to another torque delivery component or non-rotatably fixed to a transmission housing or other stationary component.

As will be detailed, bi-directional clutch assembly 20 is shown in this non-limiting embodiment to generally include a clutch module having a first clutch member (i.e., outer race) and a second clutch member (i.e., inner race), a passive one-way clutch having a plurality of passive struts, and a controllable one-way clutch having at least one active strut assembly and power-operated actuator, cumulatively defining an actuator module. As noted, the clutch 20 module is comprised of an outer race 22 and an inner race 36. Outer race 22 includes an outer ring segment 24 and an inner ring segment 26 that are spaced radially from one another and interconnected via a radial web segment 27. Outer ring segment 24 includes a plurality of outer lugs 28 that extend radially outwardly for mating with a first component. The first component can be a stationary component (such as a housing of a transmission) or a rotary component (such as a shaft). The outer ring segment 24 further includes a pair of protrusions 30 that extend radially outwardly. Each of the protrusions 30 defines a radially extending actuator pocket 32 and a strut pocket 33. It should be appreciated that more or fewer protrusions 30 could be utilized and that they may be formed integrally with outer race 22 or rigidly secured thereto. The inner ring segment 26 includes a plurality of inner ramp surfaces, hereinafter referred to as inner ratchet teeth 34, which extend radially inwardly and are evenly distributed about the axis A. The inner race 36 has an outer rim 38 and an inner rim 40 that are spaced radially from one another. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 includes a plurality of outer ramp surfaces, hereinafter referred to as outer ratchet teeth 44 that extend radially outwardly and are evenly distributed about the axis A.

The passive one-way clutch includes a plurality of passive locking elements, hereinafter passive struts 46, that are supported in strut apertures formed in the inner race 36 for pivotal movement between a locking (deployed) position and an unlocking (non-deployed) position. In the locking position, at least one of the passive struts 46 engages the inner ratchet teeth 34 of the outer race 22 for coupling the outer and inner races 22, 36 to one another during counter-clockwise rotation of the inner race 36 relative to the outer race 22. Therefore, engagement by one or more of the passive struts 46 prevents relative rotation of the outer and inner races 22, 36 in the counter-clockwise direction. However, the passive struts 46 still allow relative rotation, i.e., overrun, in the clockwise direction when located in the locked position since they are permitted to ratchet over the ramped profile of the inner ratchet teeth 34. In the unlocking position, the passive struts 46 are radially spaced from the inner ratchet teeth 34 of the outer race 22, therefore also allowing counter-clockwise rotation of the inner race 36 relative to the outer race 22. While not specifically shown, passive strut springs are provided to normally bias the passive struts 46 toward their unlocking position.

Figure 1A:
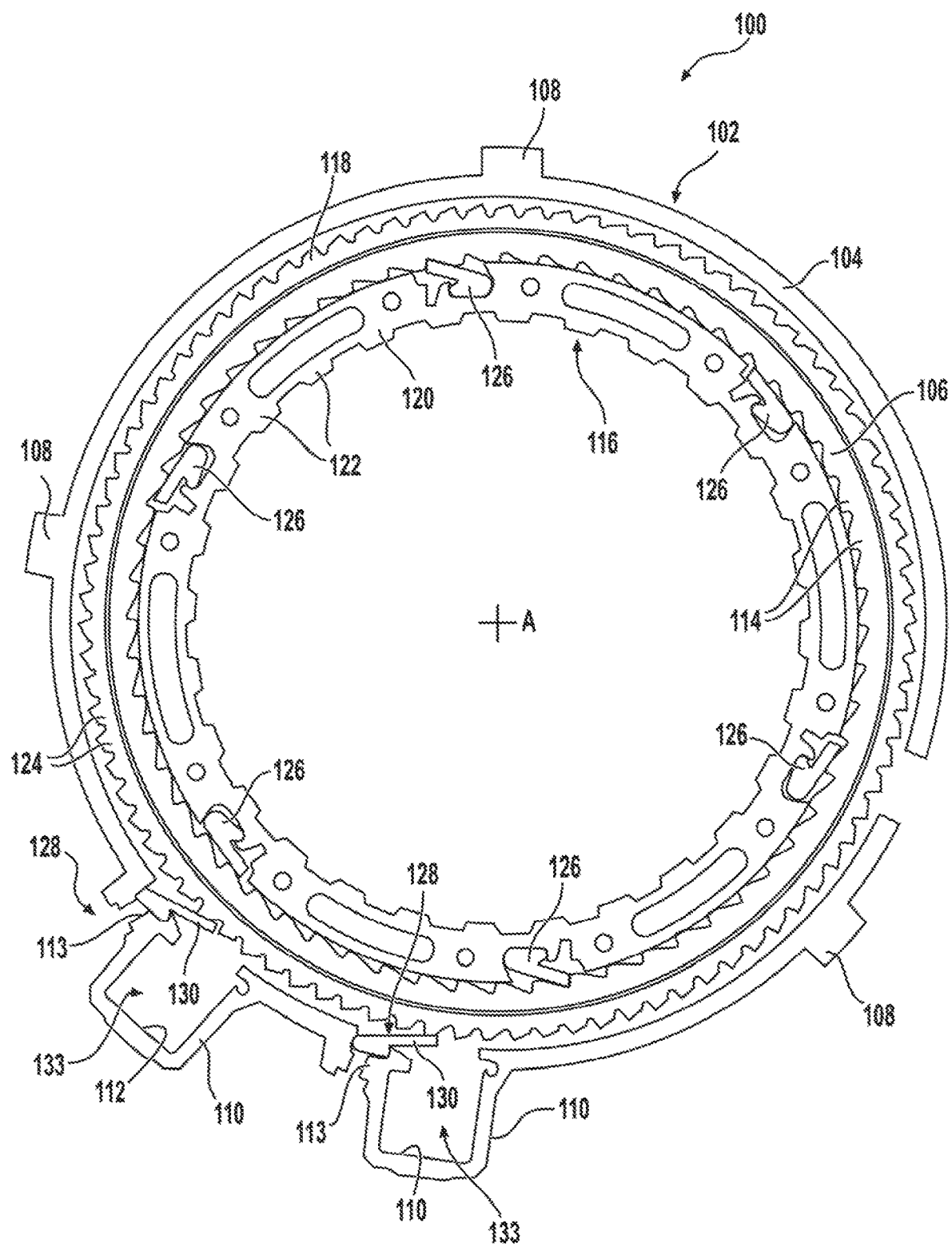
FIG. 1A is a sectional view of a bi-directional clutch similar to FIG. 1.

In association with the controllable one-way clutch, the actuator module includes a pair of active strut assemblies 48 and a pair of electromagnetic actuators 51. Each active strut assembly 48 is disposed within a corresponding one of the strut pockets 33 formed in the outer ring segment 24. Each active strut assemblies 48 includes an active locking element, a linking element, and a biasing element. The active leaking element, hereinafter referred to as active strut 50, is pivotally moveable between a locked (deployed) and an unlocked (non-deployed) position. In the locked position, the active strut 50 lockingly engages the outer ratchet teeth 44 of the inner race 36, thereby locking the outer and inner races to one another during clockwise movement of the inner race 22 relative to the outer race 22. However, the active strut 50 still allows relative displacement, i.e., overrun, in the counter-clockwise direction. In the unlocked position, the active strut 50 is radially spaced from the outer ratchet teeth 44, thereby allowing the inner and outer races 22, 36 to rotate relative to one another. Furthermore, each of the active strut assemblies 48, in this non-limiting example, includes the linking element, shown as an armature 60, that is disposed adjacent to the active strut 50 for controlling the pivotal movement of the active strut 50 in response to actuation of electromagnetic actuator 51. Thus, the active strut assemblies 48 define an "indirect" strut actuation arrangement. However, active strut assemblies 48 can alternatively be configured in a "direct" strut actuation arrangement without the armature 60 such that electromagnetic actuator 51 directly controls movement of active struts 50, such as shown in FIG. 1A.

The actuator module associated with the controllable one-way clutch is shown to include a pair of the electromagnetic actuators 51, each including a coil assembly 52 mounted in the actuator pocket 32 and being radially spaced from the active strut 50 and the armature 60. The coil assembly 52 includes a core 54 of a magnetically permeable material, a bobbin 56 disposed about the core 54, and a wire coil 58 wrapped about the bobbin 56. Furthermore, the armature 60 is disposed between the active strut 50 and the coil 58 for pivoting toward the core 54 in response to energization of the coil 58 and thus providing the pivotal movement of the active strut 50. Armature 60 can be made of a magnetic material so as to be magnetically attracted to core 54 upon energization of coil 58 or made of a non-magnetic material so as to be mechanically-coupled to a moveable component (solenoid) in alternative actuators 51.

In a preferred but non-limiting arrangement, when voltage and/or current are applied to the coils 58, the coils 58 become an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion of the armature 60 forces the active strut 50 to mechanically deploy due to the mechanical linkage between the active strut 50 and the armature 60. Upon deployment, the active strut 50 moves from its unlocked position to its locked position whereat it locates itself against one of the outer ratchet teeth 44 of the inner race 36, effectively locking the inner race 36 from rotating in that direction. Disengagement occurs as voltage and/or current is removed from the coil assembly 52, wherein the armature 60 is demagnetized and free from the coil assembly 52. The biasing member, such as a strut return spring (not shown), is positioned between the active strut 50 and the outer race 22 and causes the active strut 50 to move back to its unlocked position during disengagement.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radially stacked clutch assembly 20 offers packaging advantages over its axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of the electromagnetic actuators 51 for electrically connecting the coils 58 to one another for coordinated energization of the coils 58. It should be appreciated that the lead frame 62 could connect any number of coils 58. A printed circuit board (PCB) is attached to the lead frame 62 for selectively controlling the energization of the coils 58. The PCB is disposed radially and axially adjacent to one of the coils 58. The lead frame 62 further includes at least one power output contact that is disposed radially and axially adjacent to each of the coils 58 for electrically connecting to the coils 58 to provide power to the coils 58. Any number of power contacts could be utilized to power any number of coils 58. The lead frame 62 also includes a wire harness that extends from the printed circuit board for connecting to a transmission control module (TCM) or a powertrain control module (PCM) for transmitting data to the circuit board and to power the circuit board. Additionally, the lead frame 62 includes a plastic encapsulation or casing that is disposed about the printed circuit board and the wires for protecting the printed circuit board and the wires for allowing the lead frame 62 to be submerged in Automatic Transmission Fluid and operate in −40 C to +140 C temperatures. It should be appreciated that the aforementioned configuration of the lead frame 62 and associated components provide a low-cost, modular solution that provides for a more simplified manufacturing process.

The applied voltage to the coils 58 is comprised of a High Side (HS) and Low Side (LS) and is supplied by the TCM or the PCM of a vehicle. The HS is typically a shared power supply with other loads, and the LS is typically a discrete channel (LSD) that controls the discrete/individual circuit. The LSD is capable of controlling the amount of current across the coils 58. Since the LSD is typically located in the TCM/PCM, there is a requirement to have a wire harness between the electromagnetic actuators 51 and the TCM/PCM. If the wire harness suffers mechanical damage and the electromagnetic actuators 51 discrete LSD channel is "short circuited to chassis ground", the coils may become energized. Accordingly, an Integrated High Side Fail Safe Switch (HSFSS) is provided to add another level of logic in order to control the shared HS supply. The HSFSS is comprised of the PCB 64, a HS Switch (not shown), a transistor (not shown), and passive components (not shown). They are electrically connected to the lead frame 62. It should be appreciated that the configuration of the lead frame 62 protects the integrated electronic components (including the HSFSS), and provides improved packaging and reduced wiring. Furthermore, it should be appreciated that the modular configuration of the lead frame 62 and associate components could be utilized on other clutch assembly configurations, e.g., axially engaging clutch assemblies. The HSFSS is controlled by the OWCC_H-S_ENABLE, which enables the HSFSS to pass current to the coils 58.

Referring now to FIG. 1A, a slightly modified version of bi-directional clutch assembly 20 of FIG. 1 is now identified by reference numeral 100. Generally speaking, bi-directional clutch assembly 100 again includes a clutch module and at least one actuator module. However, in this embodiment, a "direct" strut actuation arrangement is provided between the power-operated actuator and the active strut. The clutch module includes an outer race 102 that extends annularly about an axis A. The outer race 102 presents an outer ring segment 104 and an inner ring segment 106 that are spaced radially from one another. The outer ring segment 104 includes a plurality of outer lugs 108 that extend radially outwardly for mating with a first component. The first component can be a stationary component (such as a housing of a transmission) or a rotary component (such as a shaft). The outer ring segment 104 further includes a pair of protrusions 110 that extend radially outwardly. Each of the protrusions 110 defines a radially extending actuator pocket 112 and a strut pocket 113. It should be appreciated that more or fewer protrusions 110 could be utilized. The inner ring segment 106 presents a plurality of ramped inner ratchet teeth 114 that extend radially inwardly and are evenly distributed about the axis A.

The clutch module of the clutch assembly 100 further includes an inner race 116 that also extends annularly about the axis A. The inner race 116 has an outer rim 118 and an inner rim 120 that are spaced radially from one another with the outer rim 118 disposed radially between the outer and inner ring segments 104, 106 of the outer race 102, and the inner rim 120 disposed radially inwardly from the inner ring segment 106 of the outer race 102. The inner rim 120 of the inner race 116 presents a plurality of inner lugs 122 that extend radially inwardly therefrom for mating with a second component (typically a rotary component). Further, the outer rim 118 of the inner race 116 presents a plurality of ramped outer ratchet teeth 124 that extend radially outwardly and are evenly distributed about the axis A.

The passive one-way clutch associated with bi-directional clutch assembly 100 includes six passive struts 126 that are pivotably supported by inner race 116. It should be appreciated that more or fewer passive struts 126 could alternatively be utilized. The passive struts 126 are moveable for engaging the inner ratchet teeth 114 on the inner ring segment 106 of the outer race 102 for preventing relative displacement of the inner and outer races 116, 102 in the counter-clockwise direction. However, the passive struts 126 allow relative displacement (i.e., overrun) between the inner and outer races 116, 102 in the clockwise direction.

In the controllable one-way clutch associated with bi-directional clutch assembly 100, each actuator module includes an active strut assembly 128 and an electromagnetic actuator 133. Each active strut assembly 128 is received in a corresponding one of the strut pockets 113 in the outer ring segment 104. Each of the active strut assemblies 128 includes an active strut 130 that is pivotally moveable between a locked (deployed) and an unlocked (non-deployed) position. In the locked position, the active struts 130 engage the outer ratchet teeth 124 on the inner race 116 to prevent relative displacement of the inner and outer races 102, 116 in the clockwise direction. However, the active struts 130 allow relative displacement in the counter-clockwise direction. In the unlocked position, the active struts 130 are radially spaced from the outer ratchet teeth 124, thereby allowing the inner and outer races 116, 102 to rotate relative to one another.

As noted, the actuator module of the controllable one-way clutch also includes electromagnetic actuator 133. Each electromagnetic actuator 133 is generally similar to electromagnetic actuators 51 and includes a coil assembly 52 that is radially spaced from the active strut 130 (as shown in FIG. 1). The coil assembly 52 includes a core 54 of a magnetically permeable material, a bobbin 56 disposed about the core 54, and a coil 58 wrapped about the bobbin 56. The active strut 130 is located adjacent to the coil 58 for pivoting toward the core 54 and thus providing the pivotal movement of the active strut 130 in response to energization of the coil 58.

The combination of the passive and active struts 126, 130 provide for a bi-directional configuration of the clutch assembly 100 that allows engagement in two opposite directions (clockwise and counter-clockwise). It should be appreciated that this concept is also applicable in axially oriented configurations.

Figure 2:
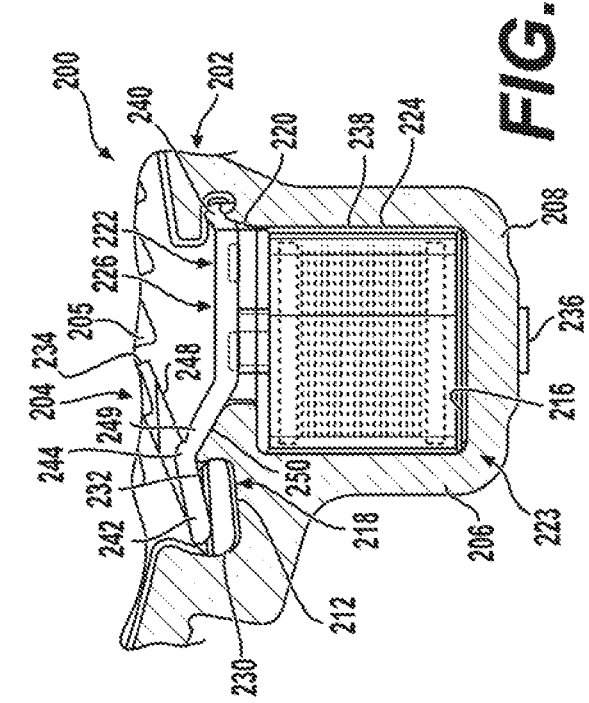
FIG. 2 is an enlarged partial view of an actuator module adapted for use with the controllable one-way clutch associated with the bi-directional clutch assemblies shown in FIGS. 1 and 1A and which is configured to provide a high inertia load resistance arrangement for resisting hydraulic strut deployment and illustrating a strut in its unlocked (non-deployed) position when a coil assembly is non-energized.
Figure 3:
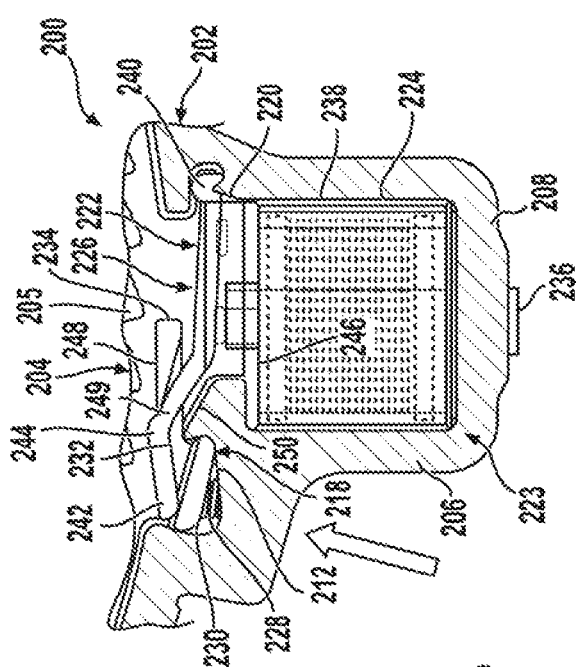
FIG. 3 is similar to FIG. 2 but illustrates the strut now located in its locked (deployed) position in response to energization of the coil assembly.
Figure 4:
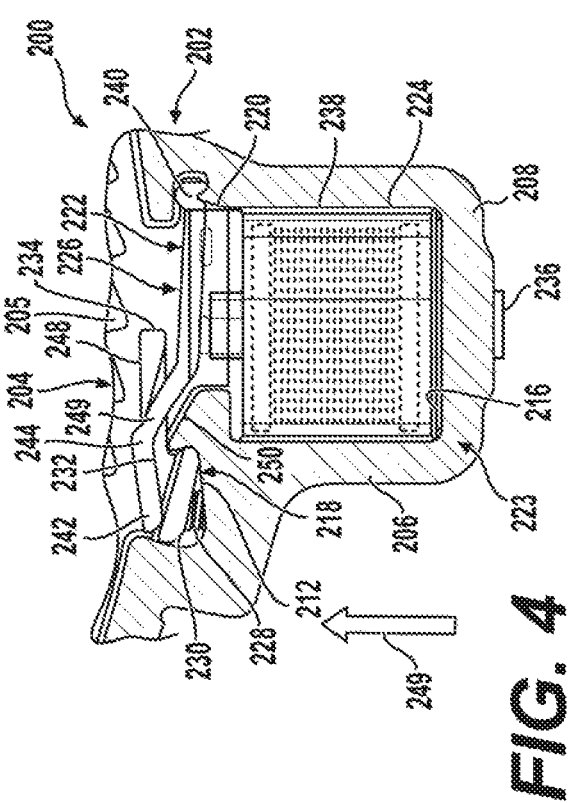
FIG. 4 is also similar to FIG. 2 but illustrates the inertia load resistance arrangement positively holding the strut in its unlocked position upon application of a radially directed high inertial load.

Referring to FIGS. 2-4, wherein like numerals indicate corresponding parts throughout the several views, a portion of another embodiment of an electrically-controlled one-way clutch assembly 200 is generally shown. The clutch assembly 200 includes a clutch module and at least one actuator module. The clutch module includes an outer race 202 that extends annularly about a center axis (not shown). Further, the clutch module includes an inner race 204 which extends annularly about the axis A and is disposed radially inwardly from the outer race 202. The inner race 204 presents a plurality of outer ratchet teeth 205 that extend radially outwardly.

The outer race 202 includes a plurality of protrusions 206 that each extend radially outwardly to a back surface 208 and each defines a pocket. Each of the pockets is divided into a strut section 212, an armature section 214 and a core section 216 with the core section 216 disposed between the strut 218 and armature sections 214. The core section 216 extends radially outwardly past the strut 218 and armature sections 214. The back surface 208 presents a pivot rail 220 that extends radially inwardly therefrom in the armature section 214.

Each actuator module includes an active strut assembly 222 and an electromagnetic actuator 223. One of the active strut assemblies 222 is received in each of the pockets 212, 214, 216 of the outer race 204. Each of the active strut assemblies 222 includes, in this non-limiting "indirect" actuation configuration, an armature 226, a strut spring 228, and a strut 218. The strut 218 includes a base segment 230 and a pair of locking arms 232. The locking arms 232 each extend from the base segment 230 to a locking edge 234. The base segment 230 is pivotally disposed in the strut 218 segment between a locked position and an unlocked position. With the strut 218 in the locked position, the locking edge 234 engages the outside teeth 205 of the inner race 204. In contrast, when the strut 218 is in the unlocked position, the locking edge 234 is radially spaced from the outside teeth 205. The strut spring 228 is disposed in the strut section 212 of the pocket 210 and extends between the back surface 208 and the strut 218 for biasing the strut 218 toward its unlocked position.

Each electromagnetic actuator 223 includes a coil assembly 224 having a core 236 of a magnetically permeable material that is disposed in the core section 216 of the pocket 210. Furthermore, at least one coil 238 is disposed in the core section 216 and wrapped about the core 236 for focusing the magnetic flux produced by the coil 238 on the core 236.

The armature 226 extends between a first end 240 that is seated in the armature section 214 and a second end 242 that is disposed in the strut section 212 in engagement with the base of the strut 218 between the legs of the strut 218. The first end 240 of the armature 226 is pivotally disposed about the pivot rail 220 in the armature section 214 of the pocket 210 for pivoting radially toward and away from the core 236 in response to energization of the coil 238 between an actuated position and a non-actuated position. In the actuated position, the armature 226 is drawn toward the core 236 and drives the strut 218 into the locked position against the biasing of strut spring 228. In the non-actuated position, the armature is spaced from the core 236 and allows the strut spring 228 to bias the strut 218 into its unlocked position. The armature 226 presents an upper bend 244 and a lower bend 246 between the first end 240 and the second end 242.

It is important, especially when the clutch assembly 200 is utilized on automotive components, for the struts 218 to only engage the outside teeth 205 of the inner race 204 when they are energized. Therefore, resistance to inertia loading (high g-force in certain directions other than simple gravity) is important for the operation of the clutch assembly 200. The most common method of resisting high inertia loading is to utilize a higher force strut spring 228. While this method is simple, there are disadvantages. One of the disadvantages is the increased resistance provided by the strut spring 228 during normal operation, which requires the armature and/or coil assembly 226, 224 to be increased in size and thickness to utilize larger magnetic forces. To accommodate such larger components, the pockets 210 may also need to be larger.

As an alternative solution to increasing the size of the armature/coil assembly 226, 224, each of the locking arms 232 includes a projection 248 that has a generally triangular shaped cross-section that extends axially, with the projections 248 of the two locking arms 232 extend toward one another. Each of the projections terminates at a point 249. Further, a shoulder 250 is defined by the upper bend 244 of the armature 226 for being engaged by the point 249 of the projections 248 of the legs of the strut 218 for limiting movement of the strut 218 toward the locked direction. Thus, during the application of inertial forces, the modified profile causes the strut 218 to stop rotating upward, therefore preventing unintended engagement of the outside teeth of the inner race 204.

FIG. 2 presents a non-energized state of the coil 238 such that the strut 218 is located in the unlocked position. Further, FIG. 3 presents an energized state of the coil 238 for causing the strut 218 to move into the locked position. FIG. 4 shows the situation in which a high inertial load is applied to the clutch assembly 200 in the radial inward direction (as shown by the arrow 249). In this situation, the armature 226 rotates clockwise slightly, however, the strut 218 is blocked from rotating counter-clockwise any further by the shoulder 250 of the armature 226. Therefore, the interference between the point 249 of the projection 248 and the shoulder 250 of the armature 226 increase the force required to move the strut 218 against the outside teeth of the inner race 204, but doesn't increase the amount of load required by the armature/coil assembly 226, 224 to move the strut 218. It should be appreciated that the projections 248 of the loading arms 232 and shoulder 250 of the armature 226 could be utilized on other active strut assembly configurations to resist high inertia loading.

Figure 5:
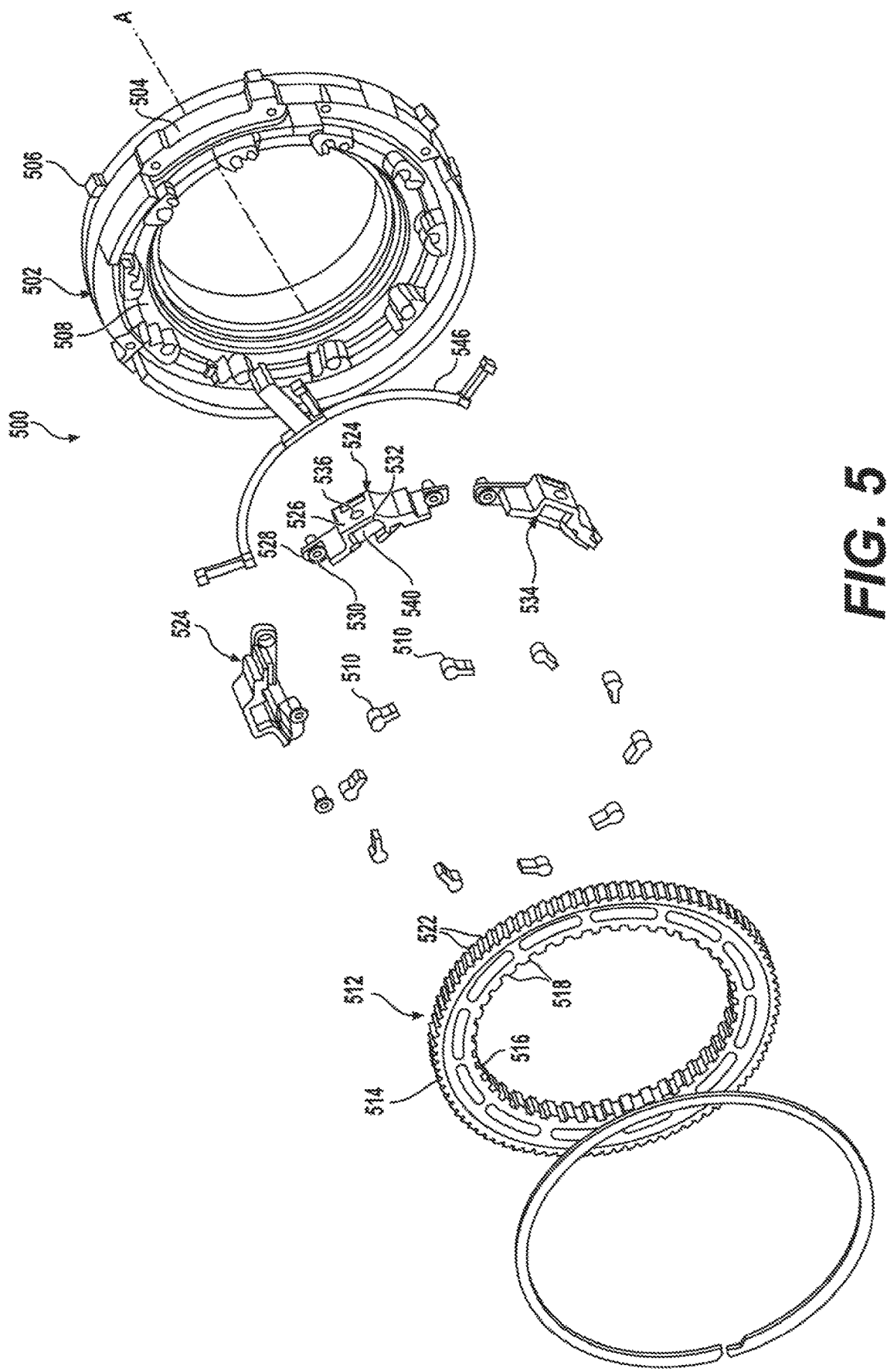
FIG. 5 is an exploded isometric view of another bi-directional clutch assembly configured to include a modular active strut arrangement for a controllable one-way clutch in accordance with another aspect of the present disclosure.

Referring now to FIG. 5, another non-limiting embodiment of a controllable bi-directional clutch assembly 500 is generally shown. The clutch assembly 500 includes a clutch module having an outer race 502 and an inner race 512. The outer race 502 extends annularly about an axis A. The outer race 502 includes an outer ring 504 that presents a plurality of outer lugs 506 that extend radially outwardly for mating with a first component. The first component can be a stationary component (such as a housing of a transmission) or a rotary component (such as a shaft). The outer race 502 further has an axial face 508 that has an annular shape that extends radially inwardly from the outer ring 504. A plurality of passive struts 510 are pivotally connected to the axial face 508. A biasing spring (not shown) engages each of the passive struts 510 for biasing the passive struts 510 in a locked position toward the inner race 512.

The inner race 512 extends annularly about the axis A. The inner race 512 has an outside band 514 and an inside band 516 that are spaced radially from one another on opposing sides of the passive struts 510. The inside band 516 of the inner race 512 presents a plurality of inner lugs 518 that extend radially inwardly therefrom for mating with a second component (typically a rotary component). The inside band 516 of the inner race 512 further presents a plurality of passive teeth 520 that extend radially outwardly therefrom for being engaged by the passive struts 510 for locking the inner and outer races 512, 502 to one another in response to counter-clockwise rotation of the inner race 512 relative to the outer race 502. The outside band 514 of the inner race 512 presents a plurality of active teeth 522 that extend radially outwardly therefrom and are evenly distributed about the axis A.

The plurality of passive struts 510 are pivotable between a locking position and an unlocking position. In the locking position, the passive struts 510 engage the passive teeth 520 of the outer race 502 for connecting the outer and inner races 502, 512 to one another during counter-clockwise rotation of the inner race 512 relative to the outer race 502. Therefore, engagement by the passive struts 510 prevents relative displacement of the outer and inner races 502, 512 in the counter-clockwise direction, however, the passive struts 510 allow relative displacement, i.e., overrun, in the clockwise direction. In the unlocking position, the passive struts 510 are radially space from the passive teeth 520 of the outer race 502, therefore allowing counter-clockwise rotation of the inner race 512 relative to the outer race 502.

A plurality of actuator modules 524 are axially connected to the outer race 502. Each actuator module 524 has a housing that is generally arc-shaped and includes a base 526 and a pair of flanges 528 that extend from opposing sides of the base 526. Each actuator module 524 also includes an active strut assembly and an electromagnetic actuator which are configured to provide a "direct" strut actuation configuration. A fastener 530, e.g., a bolt, extends through each of the flanges 528 and is connected to the outer race 502 for securing the housings of the electromagnetic actuator modules 524 to the outer race 502. The actuator modules 524 are arranged in circumferential alignment with one another about the axis A.

A coil pocket 532 extends axially into the base 526. A coil assembly 534 associated with the electromagnetic actuator is received in each of the coil pockets 532. The coil assembly 534 includes a core 536 of a magnetically permeable material, a bobbin 538 disposed about the core 536, a coil 540 wrapped about the bobbin 538, and a linearly-moveable actuation component (i.e., "plunger"). It should be appreciated that the coil assemblies 534 can advantageously be easily fitted into the pocket for easy installation.

Each of the active strut assemblies includes an active strut 542 that is selectively pivotal relative to the housing of the actuator module 524 between a locked and an unlocked position. In the locked position, the active struts 542 engage the active teeth 522 of the inner race 512, therefore locking the outer and inner races 502, 512 to one another during clockwise movement of the inner race 512 relative to the outer race 502. However, the active struts 542 allow relative displacement (i.e., overrun) in the counter-clockwise direction. In the unlocked position, the active struts 542 are radially spaced from the outside teeth 520, 522, allowing the inner and outer races 512, 502 to rotate relative to one another. An active strut spring (not shown) is also associated with each active strut assembly and is configured to normally bias the active strut 542 toward its unlocked position. In operation, energization of coil assembly 534 causes the plunger to move from a retracted position to an extended position for forcibly driving active strut 542 to move from its unlocked position into its locked position. Upon power being turned off, the plunger moves back to its retracted position which, in turn, permits the strut spring to forcibly drive the active strut 542 back to its unlocked position.

Accordingly, it should be appreciated that the modular configuration of the electromagnetic actuator modules 524 allows the active strut assemblies and electromagnetic actuator to be manufactured and assembled separately from the rest of the clutch assembly 500. Further, it should be appreciated that any number of the modules 524 could be installed on any given clutch assembly 500 as needed to provide a needed amount of torque. Additionally, it should be appreciated that the modules 524 as described herein could be utilized on various other clutch assembly configurations.

Figure 6:
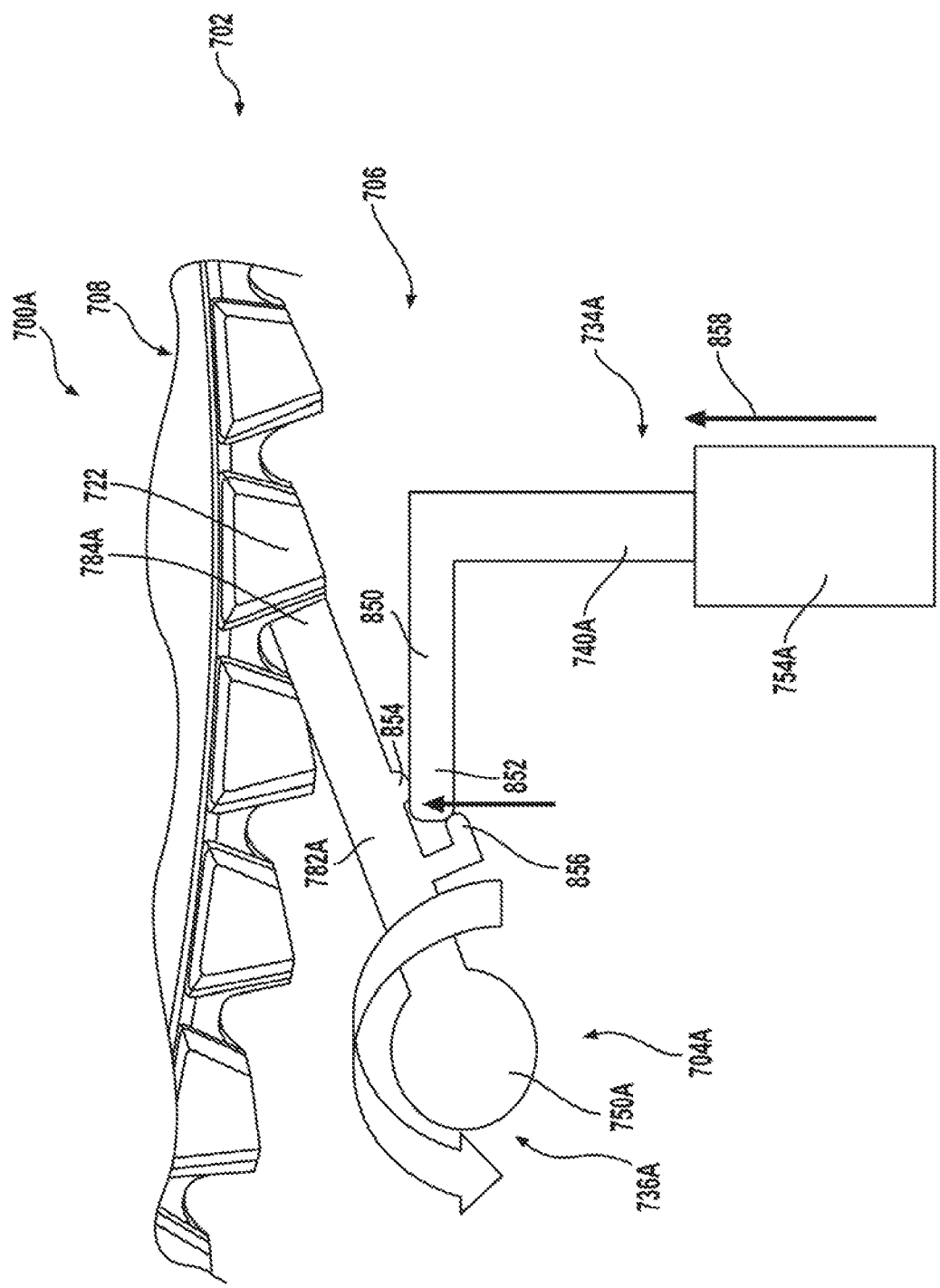
Figure 7:
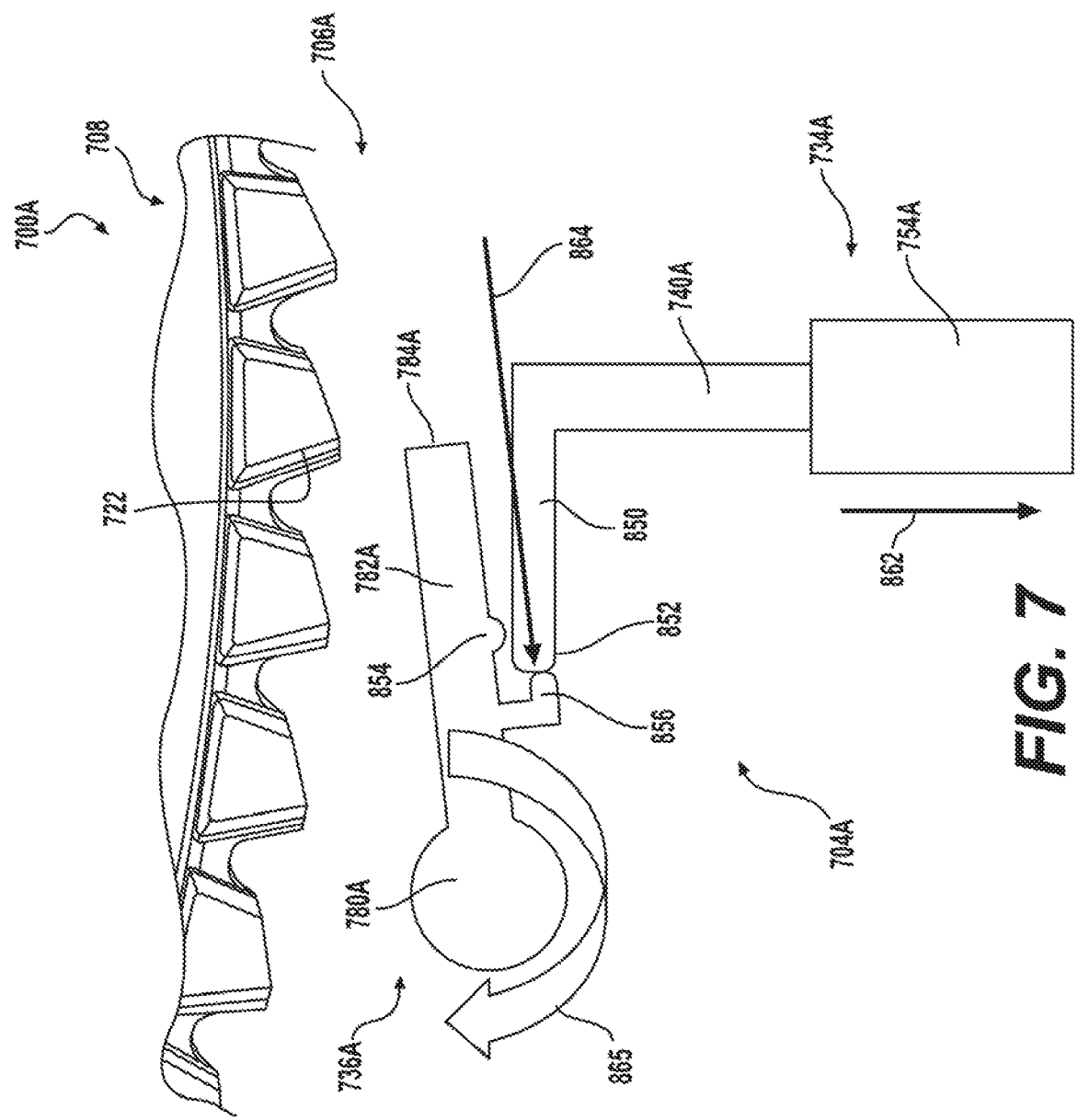
FIG. 7 illustrates this arrangement with the strut now located in its released/non-deployed position.

Referring now to FIGS. 6 and 7, an alternative embodiment of an actuator module 704A is disclosed for use with a clutch module 702 within a controllable one-way clutch assembly 700A. This arrangement is configured to employ an electromagnetic actuator 734A having a linearly-moveable actuator output member 740A to move an active strut 736A between its deployed (FIG. 6) and non-deployed (FIG. 7) positions. As seen, electromagnetic actuator 734A includes a coil assembly 754A and linearly-moveable actuator member or plunger 740A. Plunger 740A includes an actuation flange 850 with an end segment 852 engaging a pair of pivot lugs 854, 856 formed on strut segment 782A of active strut 736A. Arrow 858 indicates movement of moveable plunger 740A to an extended position in response to energization of coil assembly 754A. This action results in an actuation force, indicated by arrow 860, acting on deployment pivot lug 854 for causing active strut 736A to pivot about pivot post segment 780A to its deployed position with its end segment 784A engaged with one of ratchet teeth 722 on inner race 708.

In contrast, FIG. 7 illustrates operation of actuator module 704A when coil assembly 754A is de-energized. This de-energization causes a return spring, not shown but indicated by arrow 862, to move moveable plunger 740A to a retracted position. As a result of retraction of plunger 740A, end segment 852 of actuation flange 850 engages return pivot lug 856 on active strut 736A. This action results in a return force, as indicated by arrow 864, acting on strut 736A and causing strut 736A to pivot about its pivot post segment 780A to its released position. In addition, end segment 852 continues to engage return pivot lug 856 along the force line 864, which acts as a locking interface, so as to mechanically hold strut 736A in its released position and inhibit unintentional deployment of strut 736A when coil assembly 754A is non-energized. Arrow 865 illustrates a strut spring acting directly on an active strut 736A for biasing it toward its released position.

Figure 8:
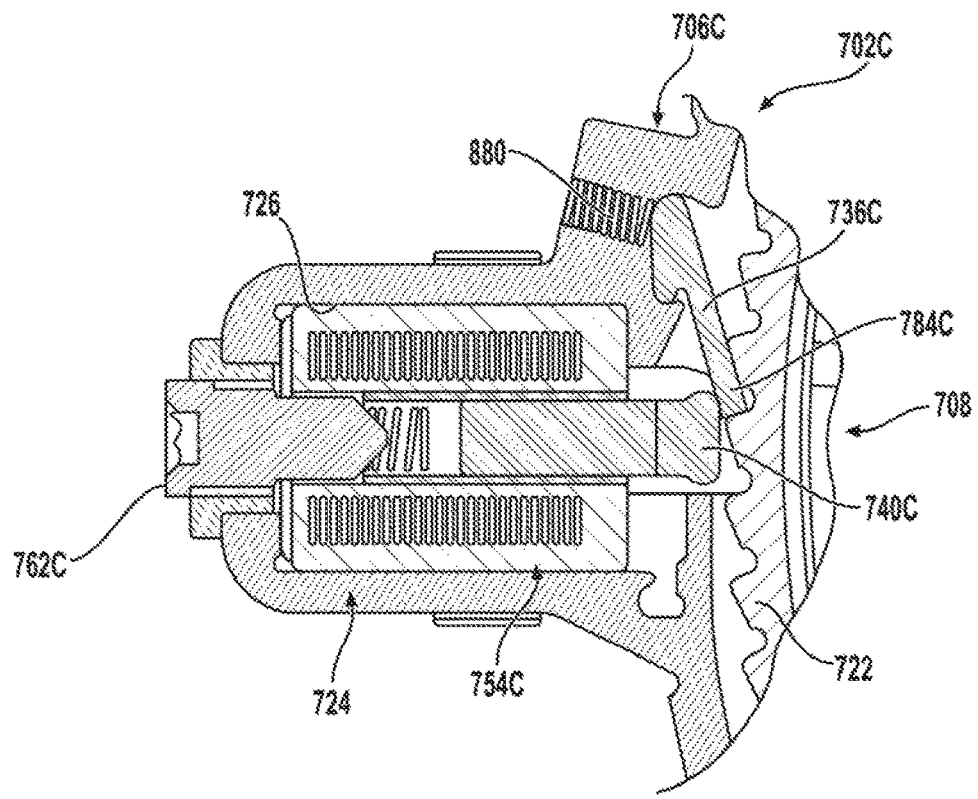
FIGS. 8 and 9 are side sectional views of yet another embodiment of an actuator module for a one-way clutch utilizing a moveable magnetic pole piece to engage and move the strut from its released/non-deployed position to its locked/deployed position in response to energization of the coil assembly.
Figure 9:
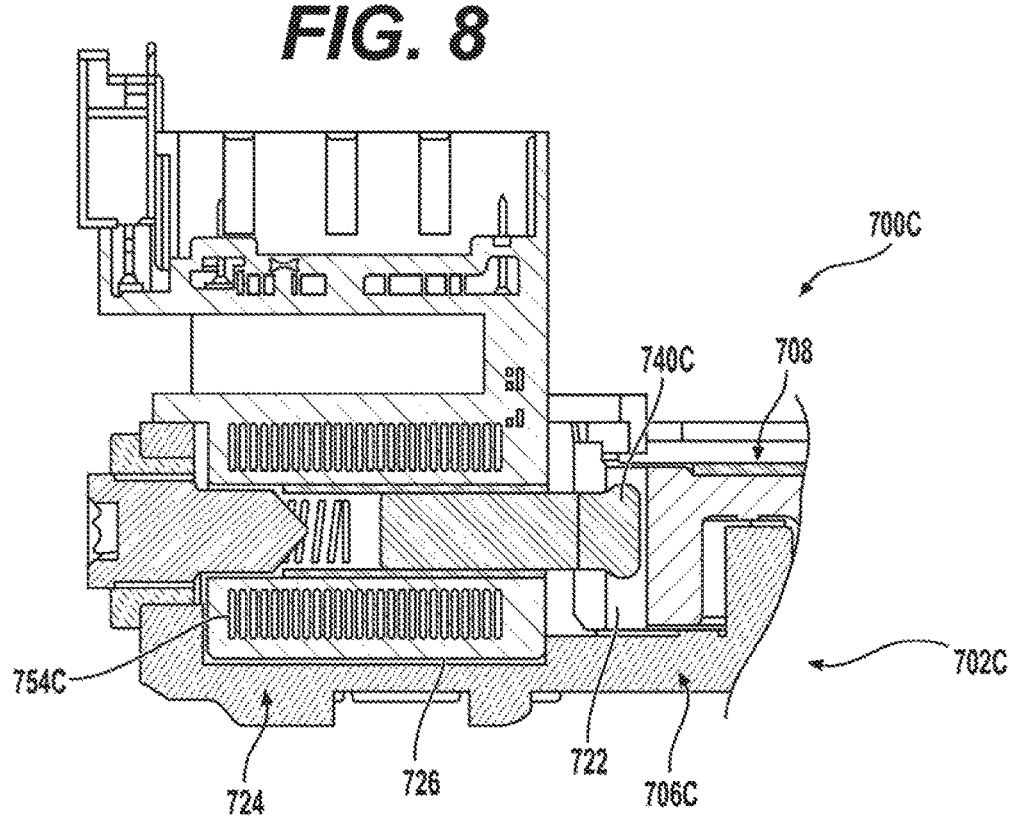

FIGS. 8 and 9 illustrate another alternative embodiment of an electromagnetic actuator module 704C configured for use in cooperation with clutch module 702C within a one-way clutch assembly 700C. In this arrangement a "direct" actuation arrangement relationship is established between a moveable magnetic pole member or plunger 740C and an active strut 736C. Both illustrations show moveable plunger 740C moved to an extend position relative to a stationary pole piece 762C in response to energization of a coil assembly 754C. This movement of plunger 740C acts to forcibly pivot active strut 736C to its locked position (shown), in opposition to the biasing of a strut spring 880, until its end section 784C is engaged with one of ratchet teeth 722 on inner race 708. The magnetic field generated upon energization of coil assembly 754C is amplified by a shortened version of stationary pole piece 762C which results in an increased engagement force acting on strut 736C when engaged with ratchet teeth 722. Strut 736C returns to its released position once coil assembly 754C is deactivated due to the biasing force applied thereto via strut spring 880.

Figure 10:
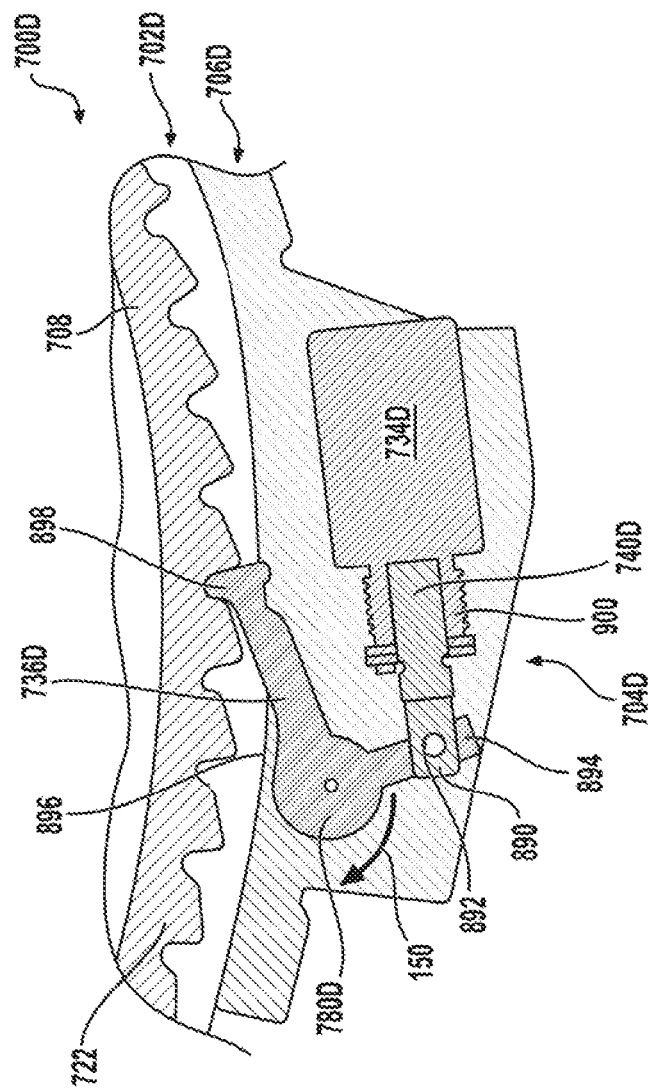
FIG. 10 illustrates a solenoid-type actuator module for use in the controllable one-way clutches of the present disclosure.

Referring now to FIG. 10, yet another alternative embodiment is shown for an actuator module 704D configured for use with clutch module 702D within a controllable one-way clutch 700D. This arrangement aims to provide improved strut motion and actuation forces by implementing a simpler strut geometry that only pivots about a load bearing area. Strut actuation is provided by a pull-type solenoid actuator 734D having a linear plunger 740D with sufficient travel to ensure that the strut 736D pivots fully between its released/ non-deployed and locked/deployed positions. A biasing spring within the solenoid actuator 734D functions to return the strut 736D to its released position following deactivation of the solenoid actuator 734D. The arrangement also employs strut 736D having a modified locking tip profile adapted to interact with the ratchet teeth 722 on the inner race 700. The modified locking tip profile acts to reject the strut 736D out of engagement if the strut 736D is not positioned deep enough in the tooth valley. The depth of strut position in the tooth valley is dependent on relative speed between the strut 736D and the inner race 700 and the actuator spring force.

FIG. 10 illustrates actuator module 704D to include solenoid actuator 734D with an axially moveable actuation member or plunger 740D. Terminal end 890 of plunger 740D is fixed via an articulating joint coupling 892 to a first leg 894 of active strut 736D which extends outwardly from a pivot post segment 780D that is pivotably supported by outer race 706D. A second leg 896 of strut 736D defines a revised tip end 898. A spring 900 acts between solenoid housing and plunger 740D. Actuation of solenoid 734D acts to retract (pull-in) plunger 740D, in opposition to spring 900, for pivoting strut 736D to the locked position shown. Arrow 781 schematically indicates a strut return spring which is discussed hereinafter in greater detail to provide an anti-tipping feature for strut 736D.

Figure 11:
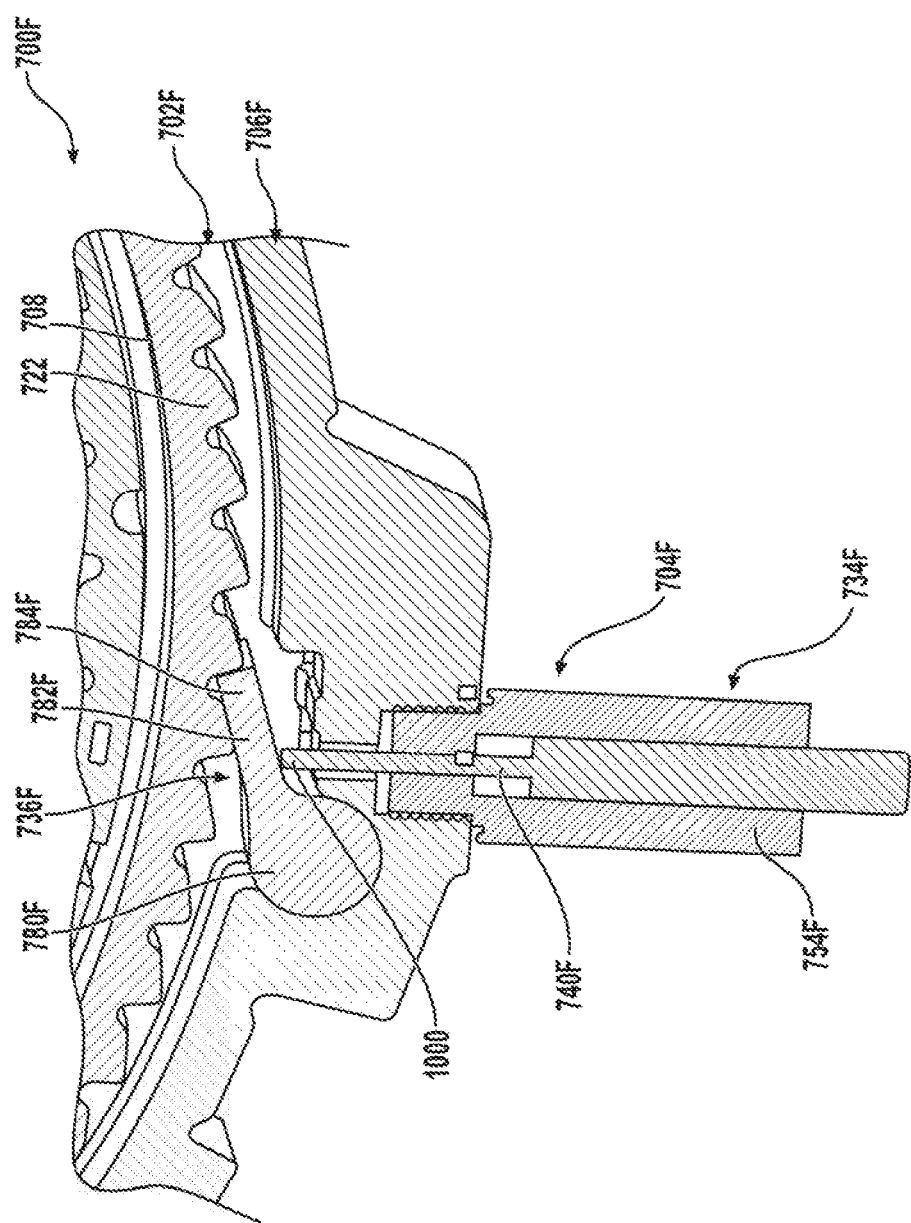
FIGS. 11-13 illustrate another embodiment of a solenoid-type actuator module for use in the controllable one-way clutches of the present disclosure.
Figure 12:
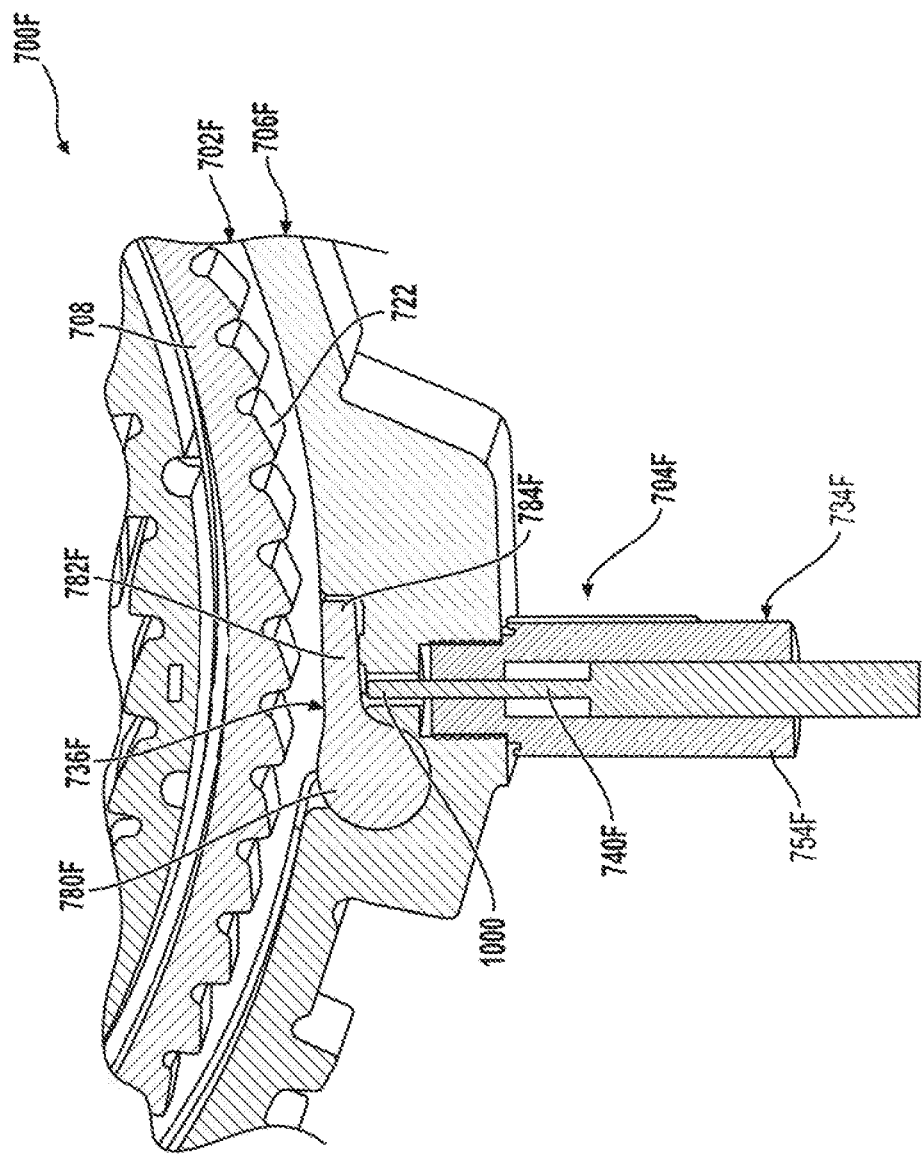
Figure 13:
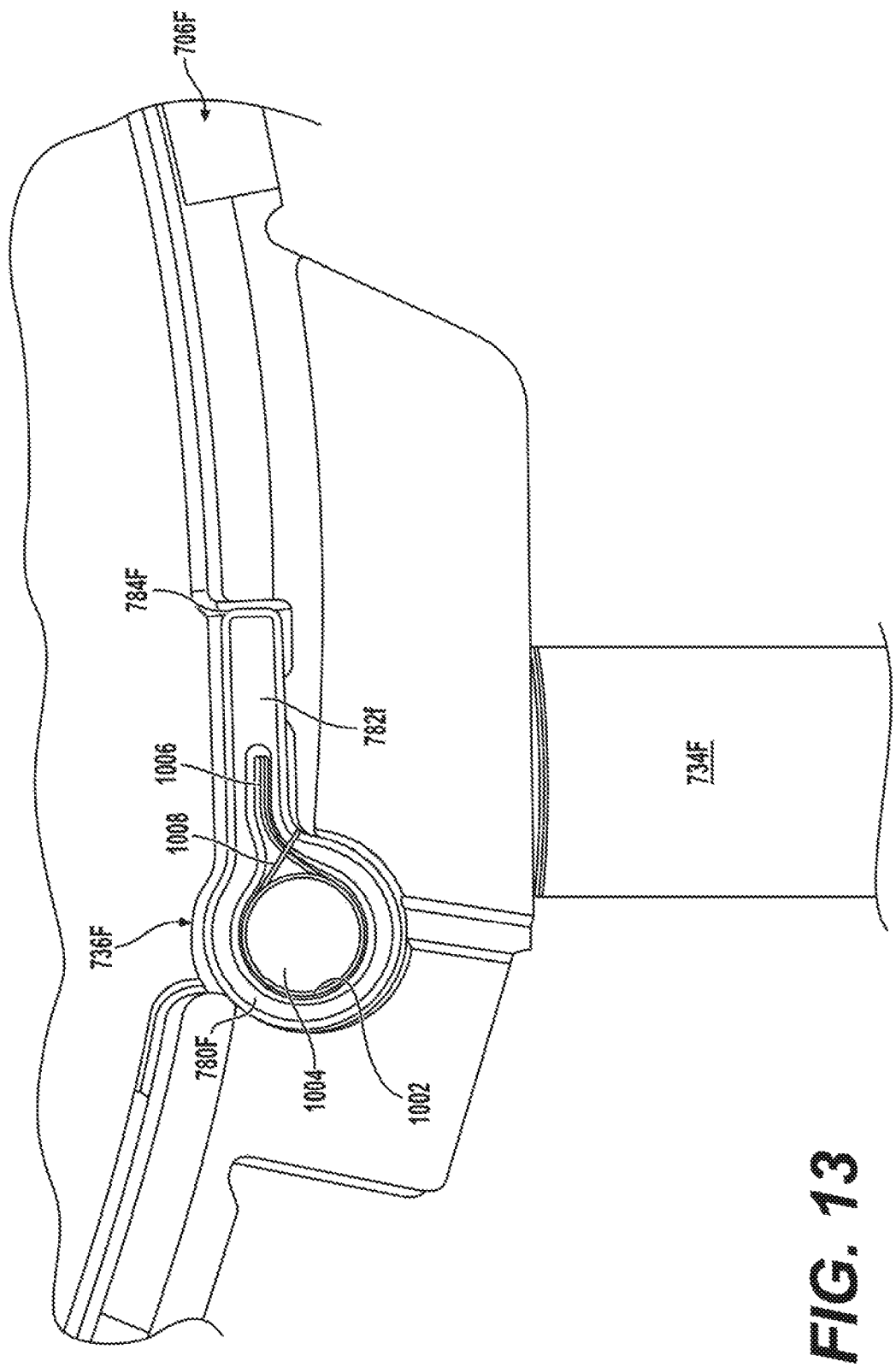

Referring now to FIGS. 11-13, yet another alternative embodiment is shown for an actuator module 704F configured for use with clutch module 702F within a controllable one-way clutch 700F. This arrangement may be useful when a pull-type solenoid (e.g., pull-type solenoid actuator 734D shown in FIG. 10) cannot be packaged. This arrangement employs an electromagnetic actuator 734F including coil assembly 754F with a linearly moveable plunger 740F (i.e., push solenoid) extending radially outwardly from the inner race 708 and outer race 706F of clutch module 702F to move active strut 736F between its deployed (FIG. 11) and non-deployed (FIG. 12) positions in response to energization of coil assembly 754F. As seen, linearly moveable plunger 740F has an end segment 1000 for engaging strut segment 782F of active strut 736F. Movement of linearly moveable plunger 740F to an extended position (FIG. 11) results in an actuation force acting on an underside strut segment 782F for causing active strut 736F to pivot about pivot post segment 780F to its deployed position with its end segment 784F engaged with one of ratchet teeth 722 on inner race 708.

FIG. 12 illustrates operation of electromagnetic actuator module 704F when coil assembly 754F is de-energized. This de-energization allows active strut 736F to pivot about pivot post segment 780F to its non-deployed position with its end segment 784F disengaged with ratchet teeth 722 on inner race 708.

As best shown in FIG. 13, active strut 736F defines a spring pocket 1002 with a circular portion 1004 disposed in pivot post segment 780F and a tang retention portion 1006 extending therefrom into the strut segment 782F. A torsion-type strut spring 1008 that has a pair of tangs is disposed within the spring pocket 1002, with one tang extending into the tang retention portion 1006 of spring pocket 1002 and the other tang disposed in a spring retention slot (not shown) formed in the outer race 706F. The angle between the spring retention slot formed in the outer race 706F and the tang retention portion 1006 ensures a preload, which can be tuned according to different inputs. This way, the linearly moveable plunger 740F (FIGS. 11 and 12) and the active strut 736F only need to make contact in the engagement direction (i.e., to move active strut 736F to its deployed position). The active strut 736F returns to its tucked-in or non-deployed position under the spring biasing action of torsion-type strut spring 1008. The linearly moveable plunger 740F returns to its power-off or disengaged position under the force of its own internal spring (not shown).

Figure 14:
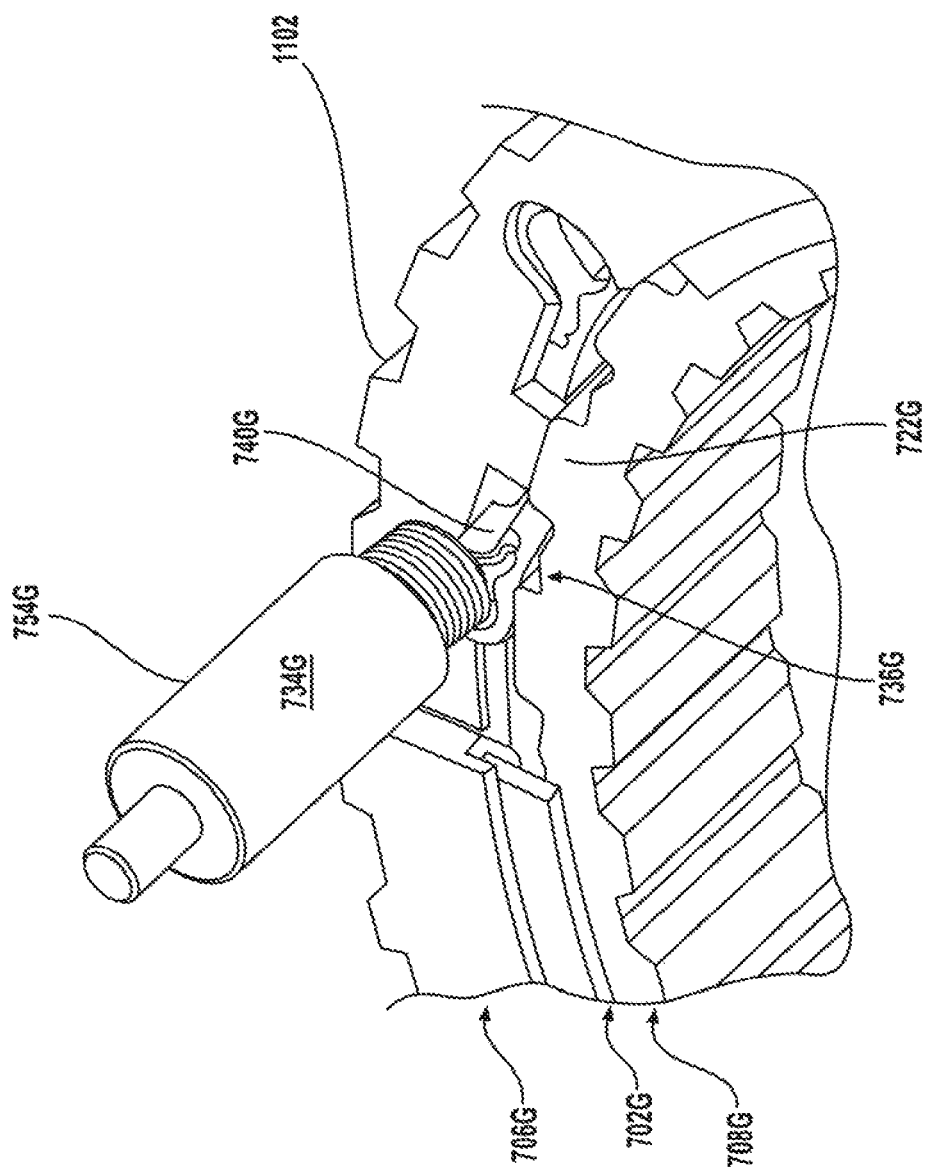
FIGS. 14 and 15 illustrate yet another embodiment of a solenoid-type actuator module for use in the controllable one-way clutches of the present disclosure.
Figure 15:
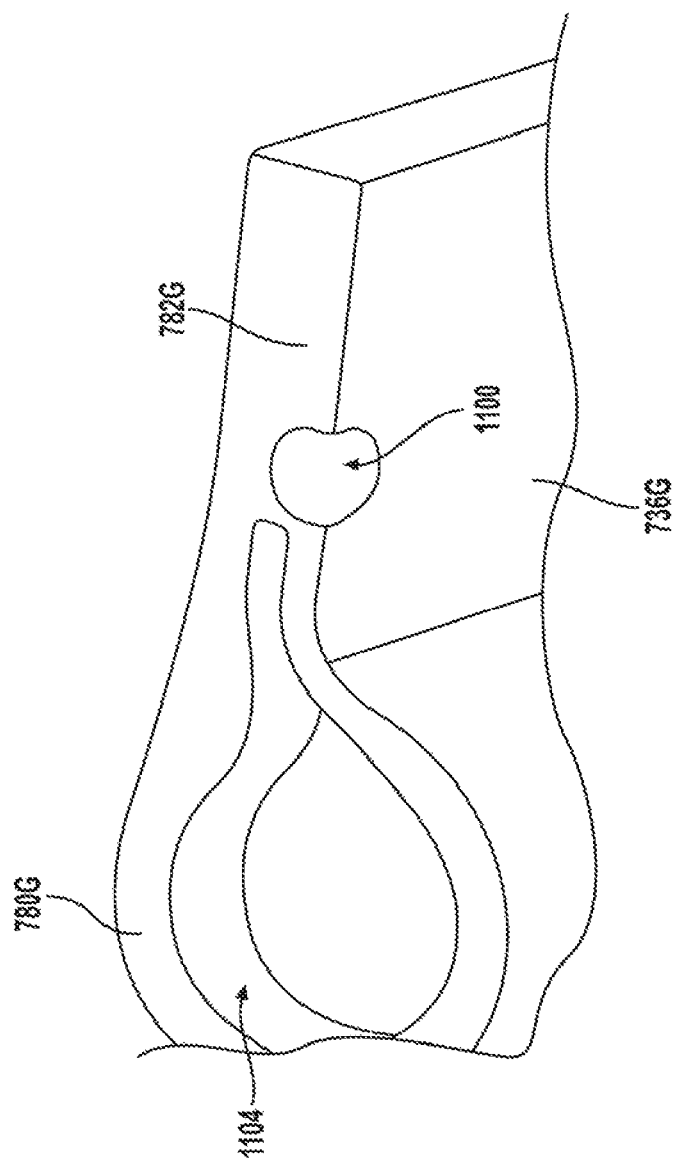

Referring to FIGS. 14 and 15, another alternative embodiment of an actuator module 704G is shown configured for use with clutch module 702G within a controllable clutch 700G. In this version, electromagnetic actuator 734G includes coil assembly 754G with a linearly moveable plunger 740G extending axially from outer race 706G of clutch module 702G to move active strut 736G between its deployed (FIG. 14) and non-deployed (not shown) positions in response to energization of coil assembly 754G. Active strut 736G defines a plunger ramp 1100 (FIG. 15) formed on a side of strut segment 782G. Linearly moveable plunger 740G has an end segment 1102 configured for engaging plunger ramp 1100 on strut segment 782G. Movement of linearly moveable plunger 740G to an extended position results in an actuation force being exerted on plunger ramp 1100 on strut segment 782G for causing active strut 736G to pivot about pivot post segment 780G to its deployed position with its end segment 784G engaged with one of ratchet teeth 722G on inner race 708G. Because plunger ramp 1100 on strut segment 782G is sloped or angled (i.e., includes a suitable inclined surface feature), linear movement of plunger 740G to its extended position causes end segment 1102 to engage plunger ramp 1100 and displace active strut 736G about pivot post segment 780G. Linearly moveable plunger 740G is positioned strategically in between a hard stop or non-deployed position of the active strut 736G. As a result of plunger ramp 1100, the linearly moveable plunger 740G wedges itself between the housing (i.e., outer race 706G) and active strut 736G to rotate active strut 736G out of its non-deployed position and into its deployed position. As the linearly moveable plunger 740G is retracted (when coil assembly 754G is de-energized), a torsion-type spring (e.g., torsion-type spring 1008 shown in FIG. 13) disposed in spring pocket 1104 of active strut 736G acts to return strut 736G to its non-deployed position.

All of the various controllable one-way clutches described previously includes an active strut pivotably supported in a first clutch member for movement between a released (non-deployed) position and a locked (deployed) position relative to ratchet teeth formed on a second clutch member of the clutch module. In each instance, the active strut was biased by a strut spring toward its non-deployed position. The following detailed description is directed to advancements and improvements made to the interface between the strut and the strut spring for providing an anti-tilting feature.

Figure 16:
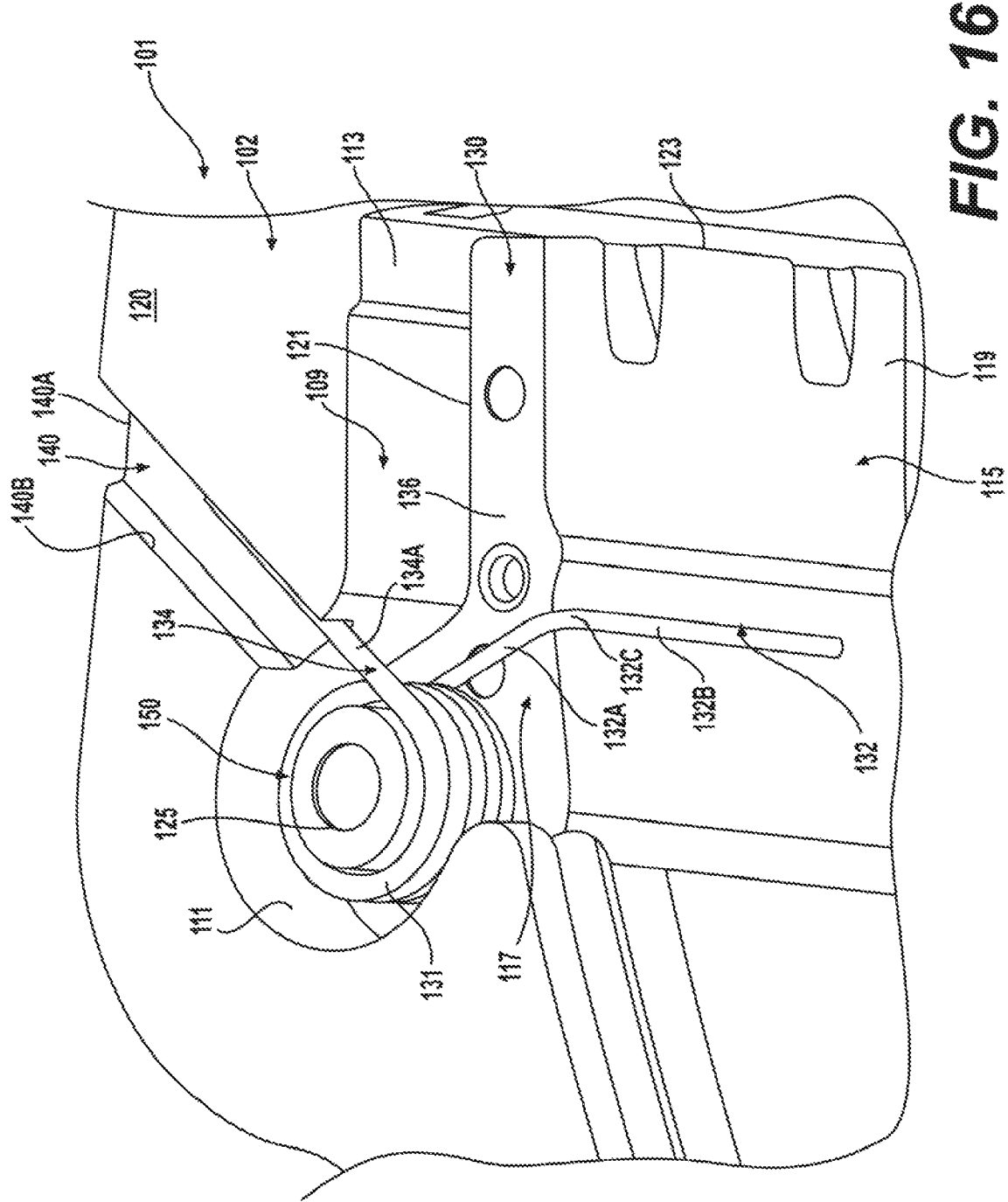
FIG. 16 is an isometric view of a portion of a controllable one-way clutch illustrating a strut and a strut spring arrangement constructed in accordance with the teachings of the present disclosure and configured to bias the strut toward its non-deployed position.
Figure 17:
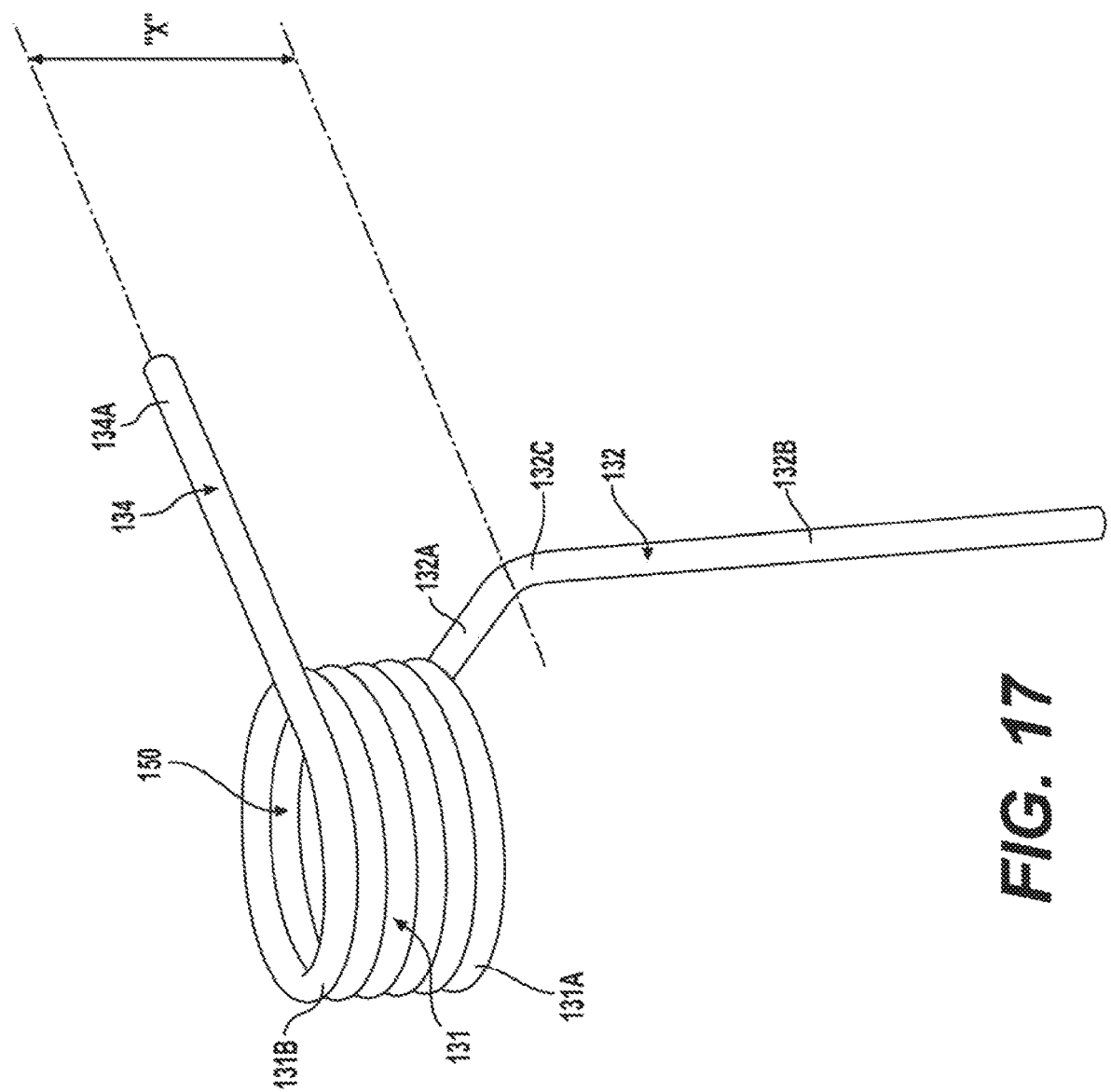
FIG. 17 is an isometric view of the strut spring shown in FIG. 16.

With reference to FIGS. 16 and 17, a portion of a controllable one-way clutch 101 is shown to include a first clutch member 102 of a clutch module (or the housing of an actuator module fixed to first clutch member 102), an active strut 130, and a strut spring 150. First clutch member 102 is shown to define a strut retention chamber 109 having a pivot chamber section 111 and a strut chamber section 113. Active strut 130 is configured to include an elongated engagement segment 115 and a pivot segment 117. As shown, pivot segment 117 of active strut 130 is disposed within pivot chamber section 111 of strut retention chamber 109 while engagement segment of active strut 130 is located within strut chamber section 113 of strut retention chamber 109. Engagement section 115 of active strut 130 includes a lower face surface 119, an upper surface 121, and a terminal end surface 123 configured to releaseably engage ratchet teeth (not shown) that are formed on a second clutch member (not shown) of the clutch module. Pivot segment 117 of active strut 130 is shown to include a cylindrical pivot post 125.

Strut spring 150 is configured, in this non-limiting embodiment, as a torsion spring having a coiled section 131, a first or inner tang section 132, and a second or outer tang section 134. Coiled section 131 of strut spring 150 is disposed to concentrically surround pivot post 125 on pivot segment 117 of active strut 130 and includes a plurality of interconnected coil loops defined between a first or inner coil loop 131A from which inner tang section 132 extends and a second or outer coil loop 131B from which outer tang section 134 extends. Inner tang section 132 is bent to define a first leg portion 132A and a second leg portion 132B. First leg portion 132 is shown in FIG. 16 located adjacent to a side surface 136 of strut 130. Second leg portion 132B is shown in FIG. 16 located in engagement with lower face surface 119 on engagement segment 115 of active strut 130. The interface between first leg portion 132A and second leg portion 132B is defined by a bend portion 132C. Bend portion 132C of inner tang section 132 of torsion spring 150 is configured to be located in proximity to the intersection of side surface 136 and lower face surface 119 on engagement segment 115 of active strut 130. FIG. 16 illustrates that second leg portion 132B of second tang segment 132 extends along and in continuous contact with lower face surface 119 of active strut 130. Preferably, the length of second leg portion 132B is selected to extend past at least one-half the width of engagement segment 115 to provide a well-distributed return force on active strut 130.

With continued reference to FIGS. 16 and 17, outer tang section 134 is shown to include a leg portion 134A disposed in a retention notch 140 formed in first clutch member 102 and which is retained in continuous engagement with a side wall portion 140A of retention notch 140. FIG. 17 indicates that a dimension "X" defining an offset distance is established between first leg portion 132A of inner tang section 132 and leg portion 134A of outer tang section 134. This offset dimension "X" is generally equivalent to the height of coiled section 131 of torsion spring 150.

Notch 140 is delineated between first side wall portion 140A and a second side wall portion 140B such that leg portion 134A of outer tang section 134 is retained in continuous engagement within retention notch 140 to prevent movement of outer tang section 134 therein. Additionally and alternatively, retention notch 140 may be configured as a bore (not shown) formed in first clutch member 102. By configuring retention notch 140 as a bore, leg portion 134A of outer tang section 134 may be retained in continuous engagement within the bore about the circumference of leg portion 134A. Additionally and alternatively, leg portion 134A of outer tang section 134 may be configured with a bent terminal end portion (not shown) to engage a bore formed in one of wall portion 140A and wall portion 140B.

Due to engagement of second leg segment 132B of inner tang section 132 with inner face surface 119 of active strut 130, and engagement of leg segment 134A of outer tang section 134 with at least one of wall portion 140A and wall portion 140B of retention notch 140, strut spring 150 is configured to normally bias active strut 130 toward its non-deployed position. However, to avoid undesirable "tilting" of coiled section 131 relative to pivot post 125 upon movement of active strut 130 to its deployed position, the dimension "X" (FIG. 17) should be minimized which, in turn, will result in less variation in the spring rate of strut spring 150. In accordance with this desire to optimize the functionality of strut spring 150, an alternative arrangement disclosed in association with FIGS. 18-20 will now be described.

Figure 18:
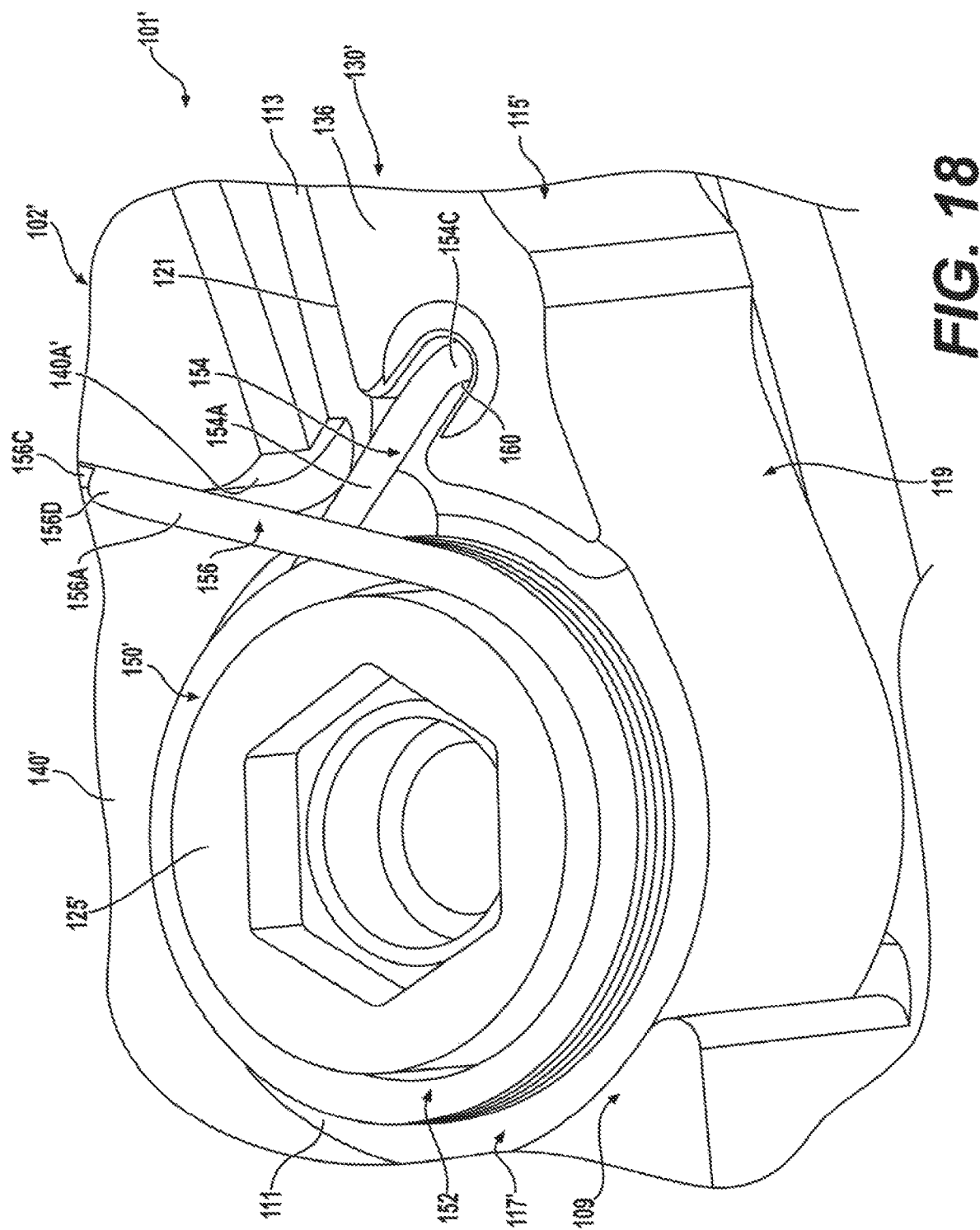

FIGS. 18-20 illustrate a portion of a controllable one-way clutch 101' modified to utilize an alternative embodiment of a strut spring 150' in association with first clutch member 102' and active strut 130'. In general, strut spring 150' is configured to significantly reduce the offset dimension "X" from that shown previously in FIG. 17 to that shown in FIG. 20 in an effort to provide an enhanced anti-tilting feature. Strut spring 150' is shown to include a coiled section 152, a first or inner tang section 154, and a second or outer tang section 156. Coiled section 152 is disposed to concentrically surround a pivot post 125' extending from a pivot segment 117' of active strut 130' and includes a plurality of interconnected coil loops defined between a first or inner coil loop 152A from which inner tang section 154 extends and a second or outer coil loop 152B from which outer tang section 156 extends. Inner tang section 154 is bent to define a first leg portion 154A located adjacent to side surface 136 of active strut 130' and a second leg portion 154B which is disposed within an elongated retainer bore 160 formed in engagement segment 115' of active strut 130'. The interface between first leg portion 154A and second leg portion 154B is defined by a bent portion 154C. Bent portion 154C of inner tang section 154 of torsion spring 150' is configured to be located in proximity to the intersection of side surface 136 and a retainer bore 160 such that substantially all of second leg portion 154B is located within retainer bore 160. Retainer bore 160 may extend completely through engagement section 115' of active strut 130'. The length of second leg portion 154B of inner tang section 154 is selected to preferably extend at least past one-half the width dimension of active strut 130' and more preferably to extend the entire width of active strut 130'.

In this particular embodiment, outer tang section 156 is also bent to define a first leg portion 156A, a second leg portion 156B, and third leg portion 156C. A first bend portion 156D interconnects first leg portion 156A and second leg portion 156B while a second bend portion 156E interconnects second leg portion 156B and third leg portion 156C. Outer tang section 156 is again retained in notched portion 140' of first clutch member 102' against side wall 140A'. As best seen from FIGS. 19 and 20, third leg portion 156C of outer tang section 156 is generally aligned in a common plane with first leg portion 154A of inner tang section 154, such that the "X" offset dimension is relatively small, if not zero.

In summary, strut spring 150' is an improvement over strut spring 150 which utilizes a bent outer tang section 156 to provide a third leg portion 156C that is located closer in relationship to first leg portion 154A of inner tang section 154, in combination with retention of second leg portion 154B of inner tang section 154 within strut bore 160, to provide an anti-tilting feature when strut spring 150' is loaded. Note that the length of second leg portion 154B of inner tang 154 is selected to extend within bore 160 greater than one-half of the strut width dimension of active strut 130'. These changes made to strut spring 150' greatly improve the spring behavior under load, thereby enabling more consistent spring loading which track theoretical values, since the lack of tilting action minimizes the friction between coiled section 152 and pivot post 125'. It is understood that an electromagnetic actuator similar to any of those previously disclosed can be used to move active strut 130, 130' from its non-deployed position into its deployed position in opposition to the biasing of strut spring 150, 150'. In addition, the improved strut spring 150, 150' can be used with any of the active strut assemblies previously described to provide the desired anti-tilting feature and improved spring rate characteristics. Finally, the improved strut spring 150, 150' can also be used in association with passive struts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A one-way clutch assembly comprising:
a clutch module having a first clutch component and a second clutch component arranged to rotate relative to the first clutch component and having ratchet teeth; and
an actuator module mounted to the first clutch component and including an electromagnetic actuator having an energizeable coil assembly and a movable actuation member, a strut pivotally mounted to the first clutch component for movement between a non-deployed position displaced from engagement with the ratchet teeth and a deployed position engaged with the ratchet teeth, and a strut biasing arrangement for biasing the strut toward its non-deployed position,
wherein the actuation member moves the strut from its non-deployed position into its deployed position in response to energization of the coil assembly,
wherein the strut biasing arrangement includes a torsion spring having a first tang section engaging the strut and a second tang section engaging a retention feature formed in the first clutch component, the first tang section being oriented relative to the second tang section to provide an anti-tilting function upon loading of the torsion spring in response to movement of the strut from its non-deployed position to its deployed position;
wherein the strut includes a pivot segment having an upstanding pivot post and an engagement segment extending from the pivot segment, wherein the engagement section includes a first face surface facing the first clutch component, a second face surface facing the ratchet teeth of the second clutch component, an end portion configured to engage the ratchet teeth when the strut is located in its deployed position, and a side surface extending between the first and second face surfaces;
wherein the first tang section includes a first leg portion interconnected to a second leg portion via a bent portion and wherein the first leg portion is aligned to extend along the side surface of the engagement segment of the strut and the second leg portion engages a retainer feature formed on the engagement segment of the strut.

2. The one-way clutch of claim 1, wherein the torsion spring includes a coiled section surrounding the pivot post and having a plurality of interconnected coil loops, and wherein a first coil loop is connected to the first tang section and a second coil loop is connected to the second tang section.

3. The one-way clutch of claim 1, wherein the retainer feature is the second face surface of the engagement segment of the strut which extends transversely with respect to the side surface, and wherein the second leg portion of the first tang section engages the second face surface.

4. The one-way clutch of claim 1, wherein the retainer feature is a bore formed in the engagement segment of the strut and which extends inwardly from the side surface, and wherein the second leg portion of the first tang section is disposed within the bore.

5. The one-way clutch of claim 1, wherein the second tang section includes a leg portion engaging the retention feature formed on the first clutch component, and wherein the distance between the first leg portion of the first tang section and the leg portion of the second tang section defines an offset dimension that provides the anti-tilting feature.

6. The one-way clutch of claim 5, wherein the retention feature formed on the first clutch is an elongated slot formed in the first clutch component and having a side wall portion in continuous engagement with the leg portion of the second tang section.

7. The one-way clutch of claim 6, wherein the retainer feature formed on the strut is the second face surface of the engagement segment which extends transversely with respect to the side surface, and wherein the second leg portion of the first tang section engages the second face surface.

8. The one-way clutch of claim 6, wherein the retainer feature formed on the strut is an elongated bore extending from the side surface into the engagement segment, and wherein the second leg portion of the first tang section is disposed within the bore.

9. A one-way clutch assembly comprising:
a clutch module having a first clutch component and a second clutch component arranged to rotate relative to the first clutch component and having ratchet teeth; and
an actuator module mounted to the first clutch component and including an electromagnetic actuator having an energizeable coil assembly and a movable actuation member, a strut pivotally mounted to the first clutch component for movement between a non-deployed position displaced from engagement with the ratchet teeth and a deployed position engaged with the ratchet teeth, and a strut biasing arrangement for biasing the strut toward its non-deployed position,
wherein the actuation member moves the strut from its non-deployed position into its deployed position in response to energization of the coil assembly,
wherein the strut biasing arrangement includes a torsion spring having a first tang section engaging the strut and a second tang section engaging a retention feature formed in the first clutch component, the first tang section being oriented relative to the second tang section to provide an anti-tilting function upon loading of the torsion spring in response to movement of the strut from its non-deployed position to its deployed position;
wherein the strut includes a pivot segment having an upstanding pivot post and an engagement segment having an end portion configured to engage the ratchet teeth when the strut is located in its deployed position, wherein the torsion spring includes a coiled section surrounding the pivot post and having a plurality of interconnected coil loops, and wherein a first coil loop is connected to the first tang section and a second coil loop is connected to the second tang section;
wherein the first tang section includes a first leg portion interconnected to a second leg portion via a bent portion and wherein the first leg portion is aligned to extend along a side surface of the engagement segment of the strut and the second leg portion engages a retainer feature formed on the engagement segment of the strut;

wherein the second tang section includes a first leg portion interconnected to a second leg portion via a first bent portion and a third leg portion interconnected to the second leg portion via a second bent portion, wherein at least portions of the second and third leg portions of the second tang section engage the retention feature formed in the first clutch component, and wherein the first leg portion of the first tang section and the third leg portion of the second tang section are aligned along a common plane to provide the anti-tilting feature.

10. The one-way clutch of claim 9, wherein the retention feature is an elongated slot formed in the first clutch component and having a side wall portion in continuous engagement with at least one of the second and third leg portions of the second tang section.

11. The one-way clutch of claim 10, wherein the retainer feature formed on the strut is an underside face surface of the engagement segment which extends transversely with respect to the side surface, and wherein the second leg portion of the first tang section is in constant engagement with the underside face surface.

12. The one-way clutch of claim 10, wherein the retainer feature formed on the strut is an elongated bore extending from the side surface into the engagement segment, and wherein the second leg portion of the first tang section is disposed within the bore.

13. A one-way clutch comprising:
a clutch module having a first clutch component and a second clutch component arranged to rotate relative to the first clutch component and having ratchet teeth; and
an actuator module mounted to the first clutch component and including an electromagnetic actuator having an energizeable coil assembly and a movable actuation member, a strut supported for movement between a non-deployed position displaced from engagement with the ratchet teeth and a deployed position engaged with the ratchet teeth, and a strut biasing arrangement for biasing the strut toward its non-deployed position,
wherein the actuation member moves from a first position to a second position in response to energization of the coil assembly for causing the strut to move from its non-deployed position into its deployed position, and wherein the actuation member returns to its first position in response to de-energization of the coil assembly such that the strut biasing arrangement drives the strut back to its non-deployed position,
wherein the strut biasing arrangement includes a torsion spring having a coiled section surrounding a pivot post extending from the strut, a first tang section extending from the coiled section in a first radial direction relative to a central axis of the coiled section and engaging a retainer feature formed on the strut, and a second tang section extending from the coiled section in a second radial direction relative to the central axis of the coiled section and engaging a retention feature formed on the first clutch component;
wherein the first tang section includes a first leg portion interconnected to a second leg portion via a bent portion wherein the first and second leg portions are aligned in a plane that is transverse to the second radial direction of the second tang section.

14. The one-way clutch of claim 13, wherein the first leg portion is aligned to extend along a side surface of an engagement segment of the strut and the second leg portion engages the retainer feature, wherein the retainer feature is formed on the engagement segment of the strut, wherein the retainer feature is aligned transverse to the side surface.

15. The one-way clutch of claim 14, wherein the retainer feature is an underside face surface of the engagement segment of the strut which extends transversely with respect to the side surface, and wherein the second leg portion of the first tang section engages the underside face surface.

16. The one-way clutch of claim 14, wherein the retainer feature is a bore formed in the engagement segment of the strut and which extends inwardly from the side surface, and wherein the second leg portion of the first tang section is disposed within the bore.

17. A one-way clutch comprising:
a clutch module having a first clutch component and a second clutch component arranged to rotate relative to the first clutch component and having ratchet teeth; and
an actuator module mounted to the first clutch component and including an electromagnetic actuator having an energizeable coil assembly and a movable actuation member, a strut supported for movement between a non-deployed position displaced from engagement with the ratchet teeth and a deployed position engaged with the ratchet teeth, and a strut biasing arrangement for biasing the strut toward its non-deployed position,
wherein the actuation member moves from a first position to a second position in response to energization of the coil assembly for causing the strut to move from its non-deployed position into its deployed position, and wherein the actuation member returns to its first position in response to de-energization of the coil assembly such that the strut biasing arrangement drives the strut back to its non-deployed position,
wherein the strut biasing arrangement includes a torsion spring having a coiled section surrounding a pivot post extending from the strut, a first tang section extending from the coiled section and engaging a retainer feature formed on the strut, and a second tang section extending from the coiled section and engaging a retention feature formed on the first clutch component; and
wherein the second tang section includes a first leg portion interconnected to a second leg portion via a first bent portion and a third leg portion interconnected to the second leg portion via a second bent portion, wherein at least portions of the second and third leg portions of the second tang section engage the retention feature formed in the first clutch component, and wherein the first leg portion of the first tang section and the third leg portion of the second tang section are aligned along a common plane to provide the anti-tilting feature.

18. The one-way clutch of claim 17, wherein the retention feature is an elongated slot formed in the first clutch component and having a side wall portion in continuous engagement with at least one of the second and third leg portions of the second tang section.

19. The one-way clutch of claim 18, wherein the retainer feature formed on the strut is an underside face surface of an engagement segment which extends transversely with respect to a side surface of the engagement segment, and wherein the second leg portion of the first tang section is in constant engagement with the underside face surface.

20. The one-way clutch of claim 18, wherein the retainer feature formed on the strut is an elongated bore extending from a side surface into an engagement segment, and wherein the second leg portion of the first tang section is disposed within the bore.

* * * * *